DOCUMENT INSCRIBING MACHINE

Filed Nov. 18, 1957 27 Sheets-Sheet 1

May 15, 1962 J. A. WEIDENHAMMER ET AL 3,034,782

DOCUMENT INSCRIBING MACHINE

Filed Nov. 18, 1957 27 Sheets-Sheet 3

May 15, 1962 J. A. WEIDENHAMMER ET AL 3,034,782

DOCUMENT INSCRIBING MACHINE

Filed Nov. 18, 1957 27 Sheets-Sheet 4

May 15, 1962 J. A. WEIDENHAMMER ET AL 3,034,782

DOCUMENT INSCRIBING MACHINE

Filed Nov. 18, 1957

27 Sheets-Sheet 5

May 15, 1962 J. A. WEIDENHAMMER ET AL 3,034,782

DOCUMENT INSCRIBING MACHINE

Filed Nov. 18, 1957 27 Sheets-Sheet 6

May 15, 1962 J. A. WEIDENHAMMER ET AL 3,034,782

DOCUMENT INSCRIBING MACHINE

Filed Nov. 18, 1957 27 Sheets-Sheet 9

May 15, 1962 J. A. WEIDENHAMMER ET AL 3,034,782

DOCUMENT INSCRIBING MACHINE

Filed Nov. 18, 1957 27 Sheets-Sheet 15

May 15, 1962 J. A. WEIDENHAMMER ET AL 3,034,782

DOCUMENT INSCRIBING MACHINE

Filed Nov. 18, 1957 27 Sheets-Sheet 16

May 15, 1962 J. A. WEIDENHAMMER ET AL 3,034,782

DOCUMENT INSCRIBING MACHINE

Filed Nov. 18, 1957 27 Sheets-Sheet 17

May 15, 1962 J. A. WEIDENHAMMER ET AL 3,034,782

DOCUMENT INSCRIBING MACHINE

Filed Nov. 18, 1957 27 Sheets-Sheet 21

May 15, 1962 J. A. WEIDENHAMMER ET AL 3,034,782

DOCUMENT INSCRIBING MACHINE

Filed Nov. 18, 1957 27 Sheets-Sheet 24

May 15, 1962 J. A. WEIDENHAMMER ET AL 3,034,782

DOCUMENT INSCRIBING MACHINE

Filed Nov. 18, 1957 27 Sheets-Sheet 26

May 15, 1962 J. A. WEIDENHAMMER ET AL 3,034,782

DOCUMENT INSCRIBING MACHINE

Filed Nov. 18, 1957 27 Sheets-Sheet 27

United States Patent Office 3,034,782
Patented May 15, 1962

3,034,782

DOCUMENT INSCRIBING MACHINE

James A. Weidenhammer, Poughkeepsie, Edward J. Wroblewski, Millbrook, and Norman Watkins, Stanley J. Culveyhouse, and Louis Serenate, Poughkeepsie, N.Y., assignors to International Business Machines Corporation, New York, N.Y., a corporation of New York Filed Nov. 18, 1957, Ser. No. 697,203
5 Claims. (Cl. 271—3)

This invention relates to printing devices and more particularly to an improved document feeding device for a printer.

This machine is for use in printing on documents of varying thickness and shape such as bank checks. It is well known that the feeding of documents of this character is hampered by the difficulty in varying the feed conditions to overcome such variations. Also it has been found difficult to accurately align documents of this character.

It is, therefore, the principal object of this invention to provide a machine which will accurately feed documents of varying shape and thickness in alignment with a printing position.

A further object is to provide a belt feed whereby a document is accurately aligned at a printing position.

Another object is to provide a novel means for positioning a printing device in a movable carriage.

A still further object is to provide an indexing mechanism for a print carriage that uses a novel form of intermittent drive.

Another object is to provide a flexing device for stiffening a document during feeding and stacking.

Other objects of the invention will be pointed out in the following description and claims and illustrated in the accompanying drawings, which disclose, by way of example, the principle of the invention and the best mode, which has been contemplated, of applying that principle.

Figure 2:
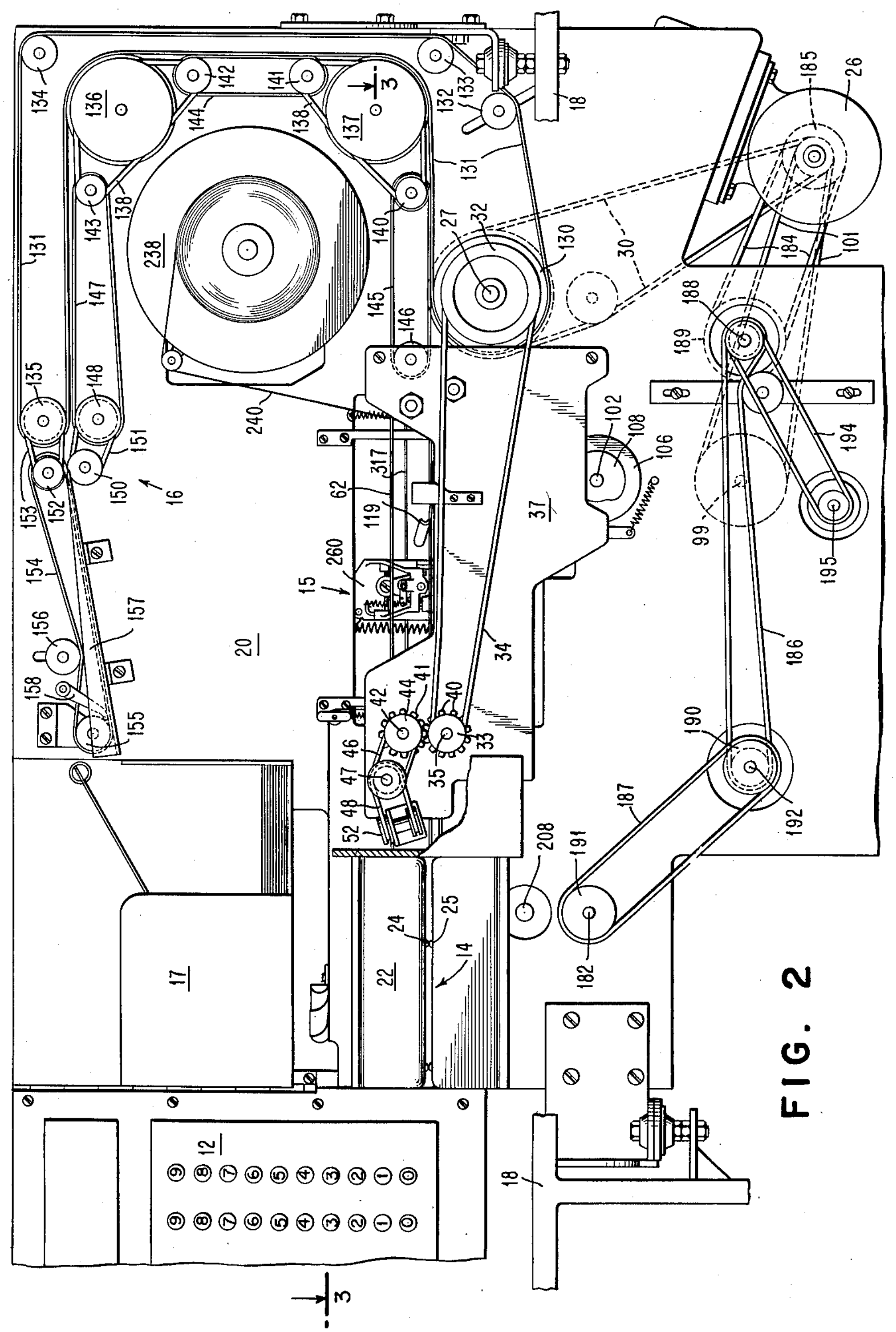
FIG. 2 is a partial front view of the machine with the covers removed showing the principal members and their associated drives.
Figure 3:
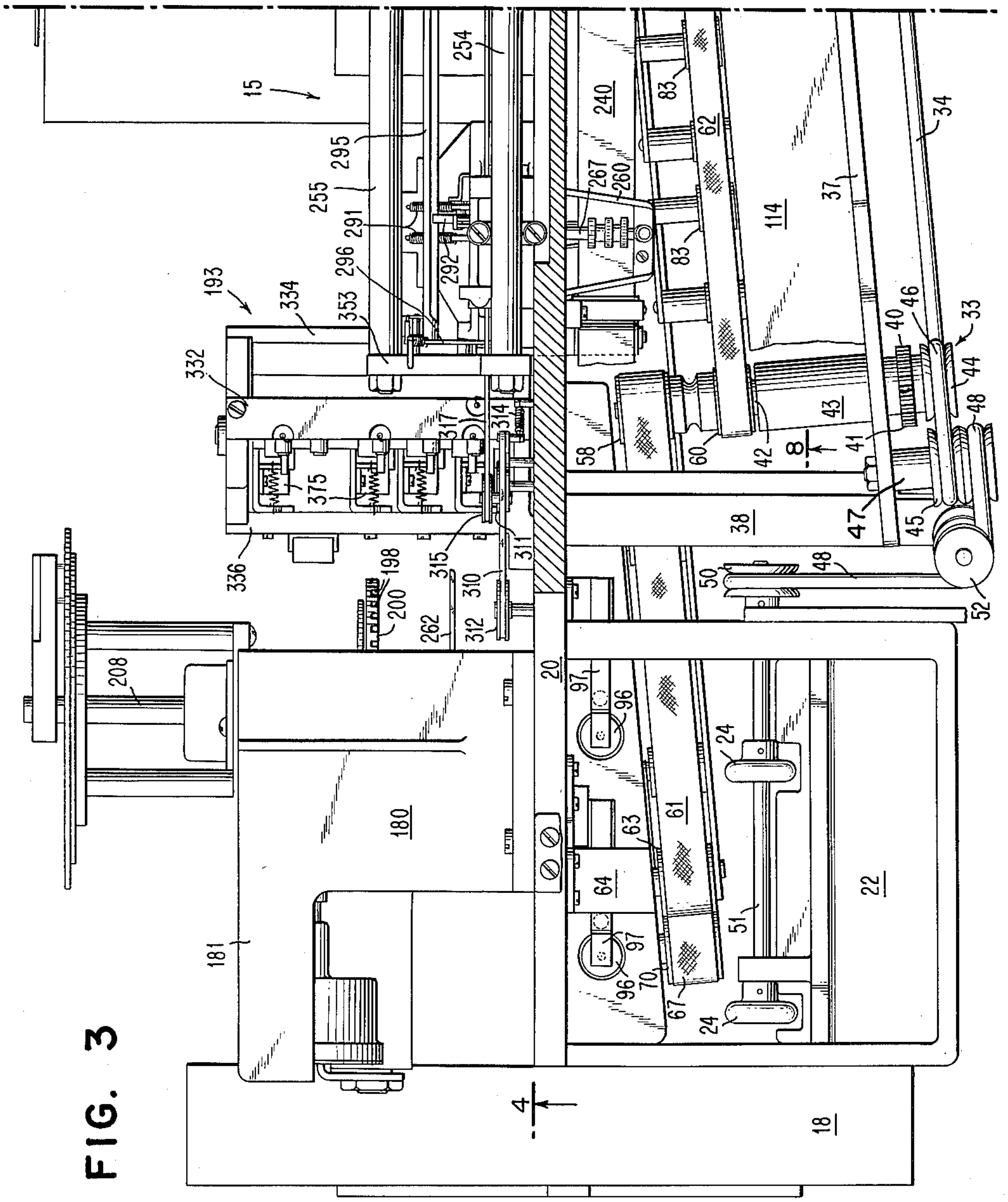
Figure 3A:
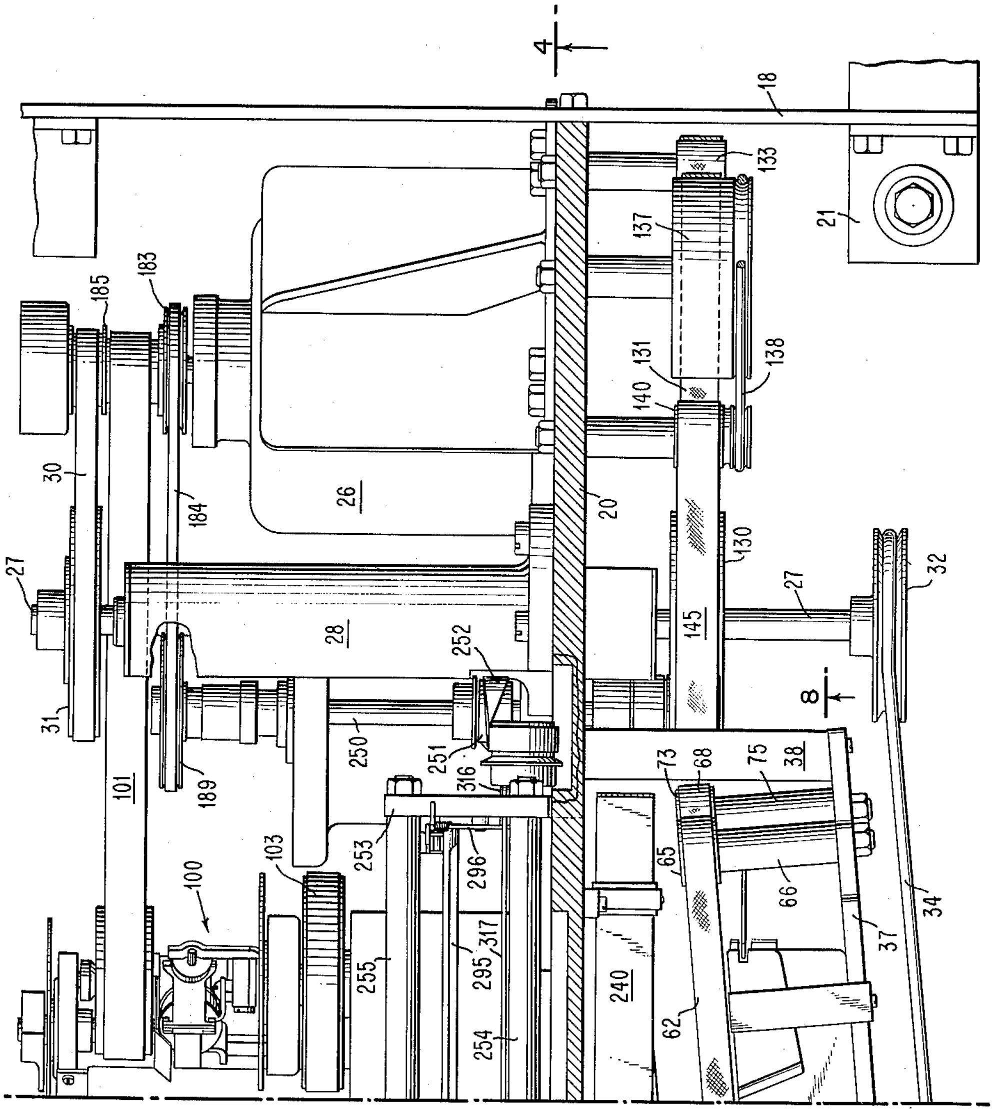
Figure 4:
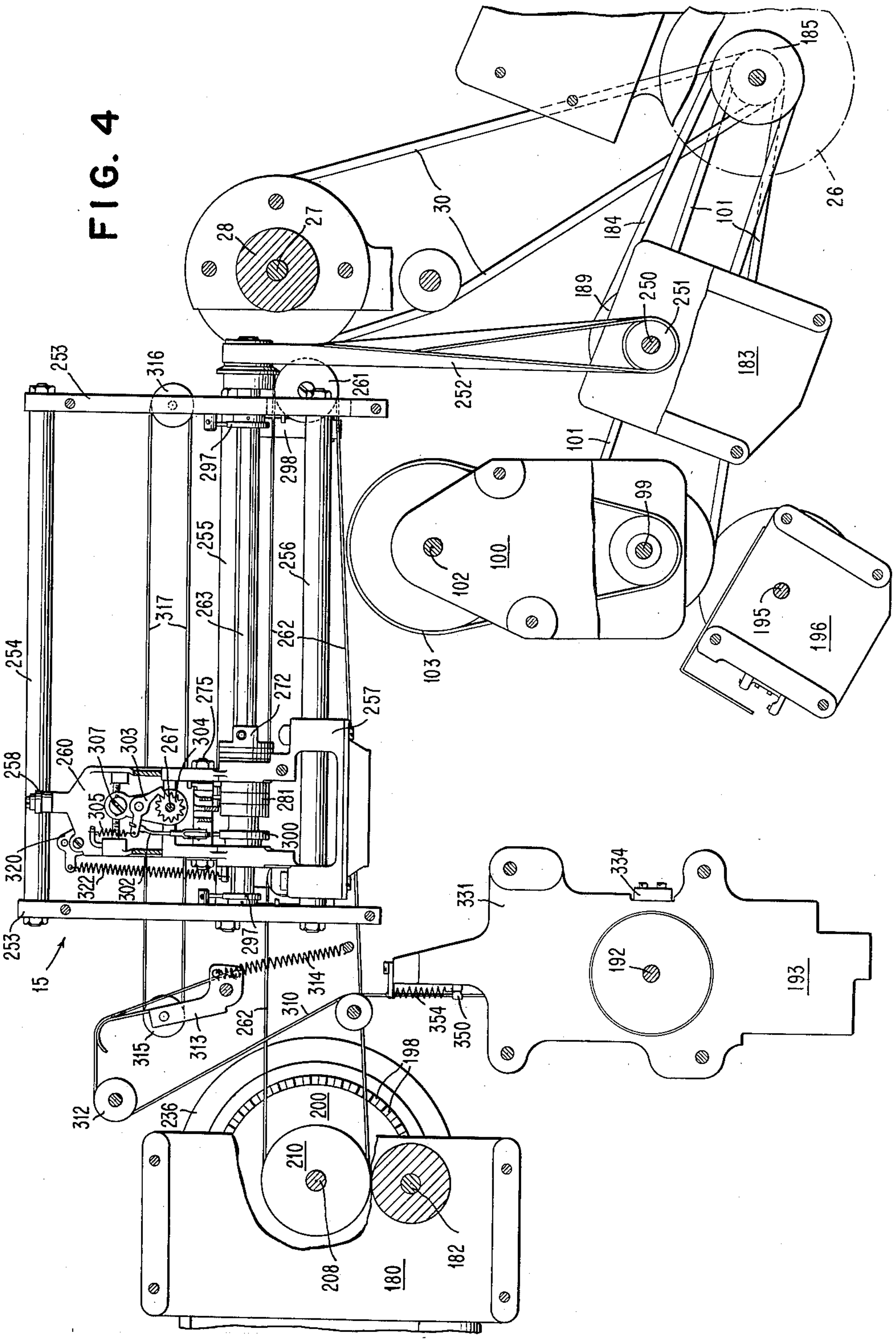
Figure 5:
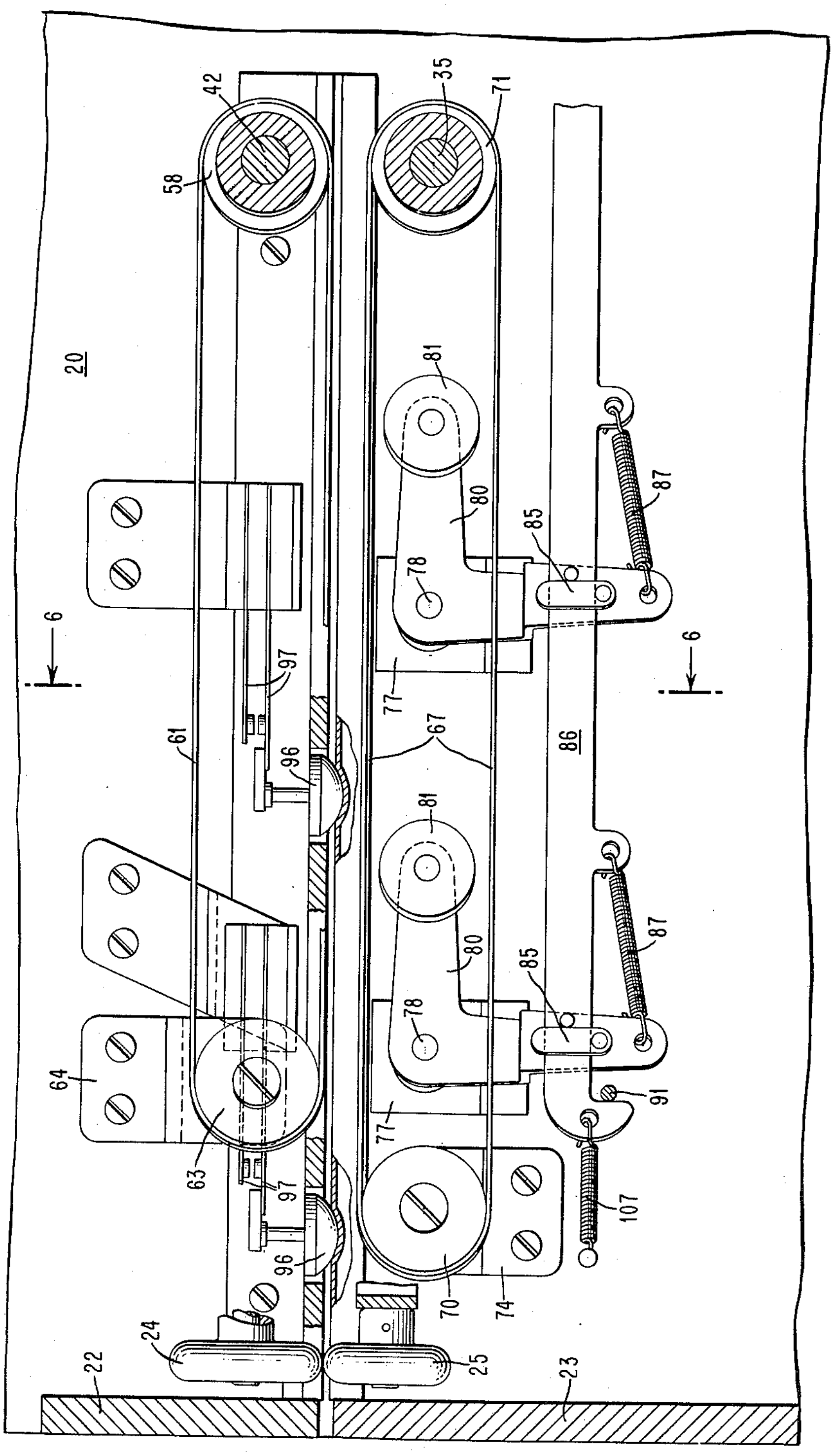
Figures 6, 7:
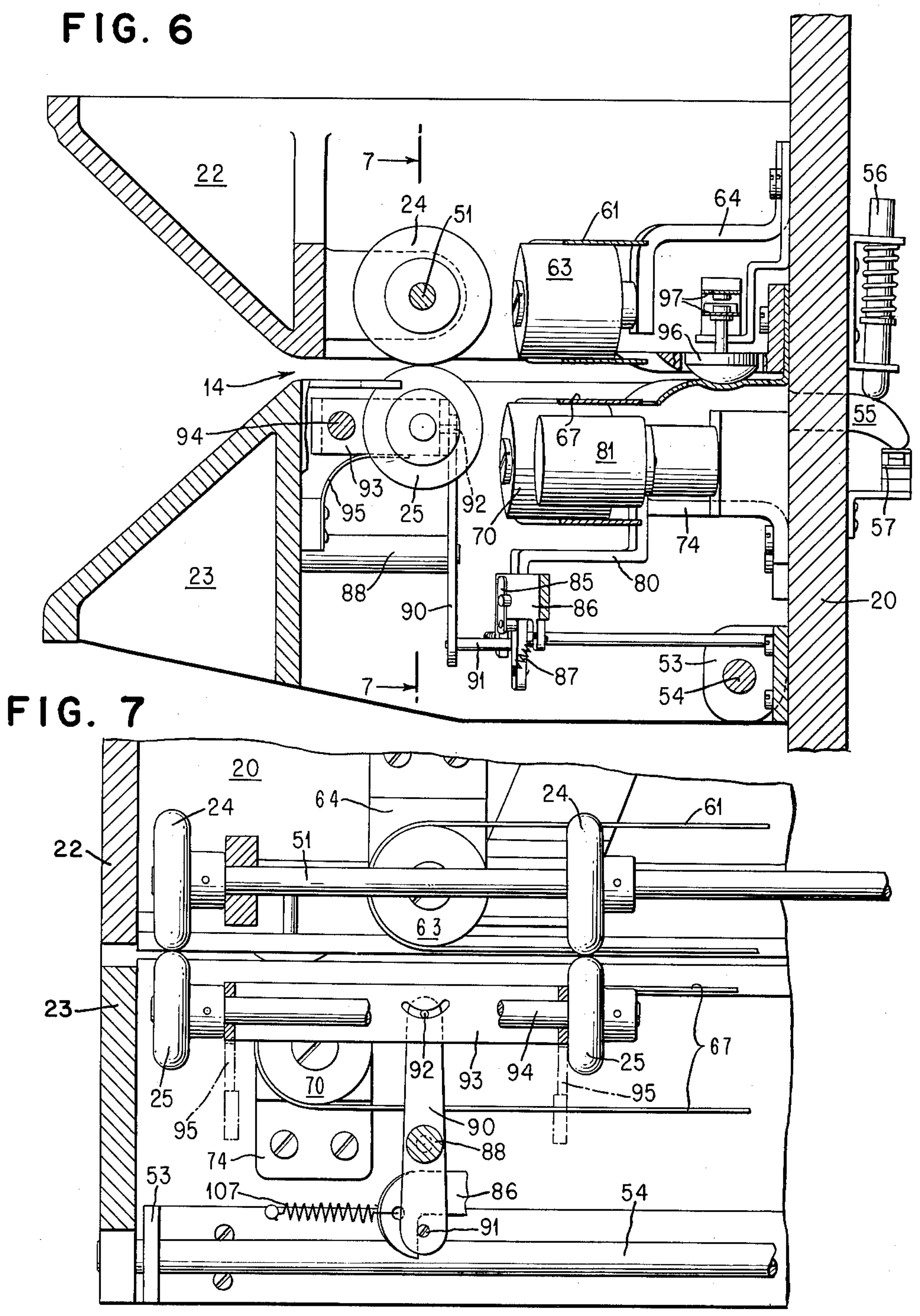
Figure 8:
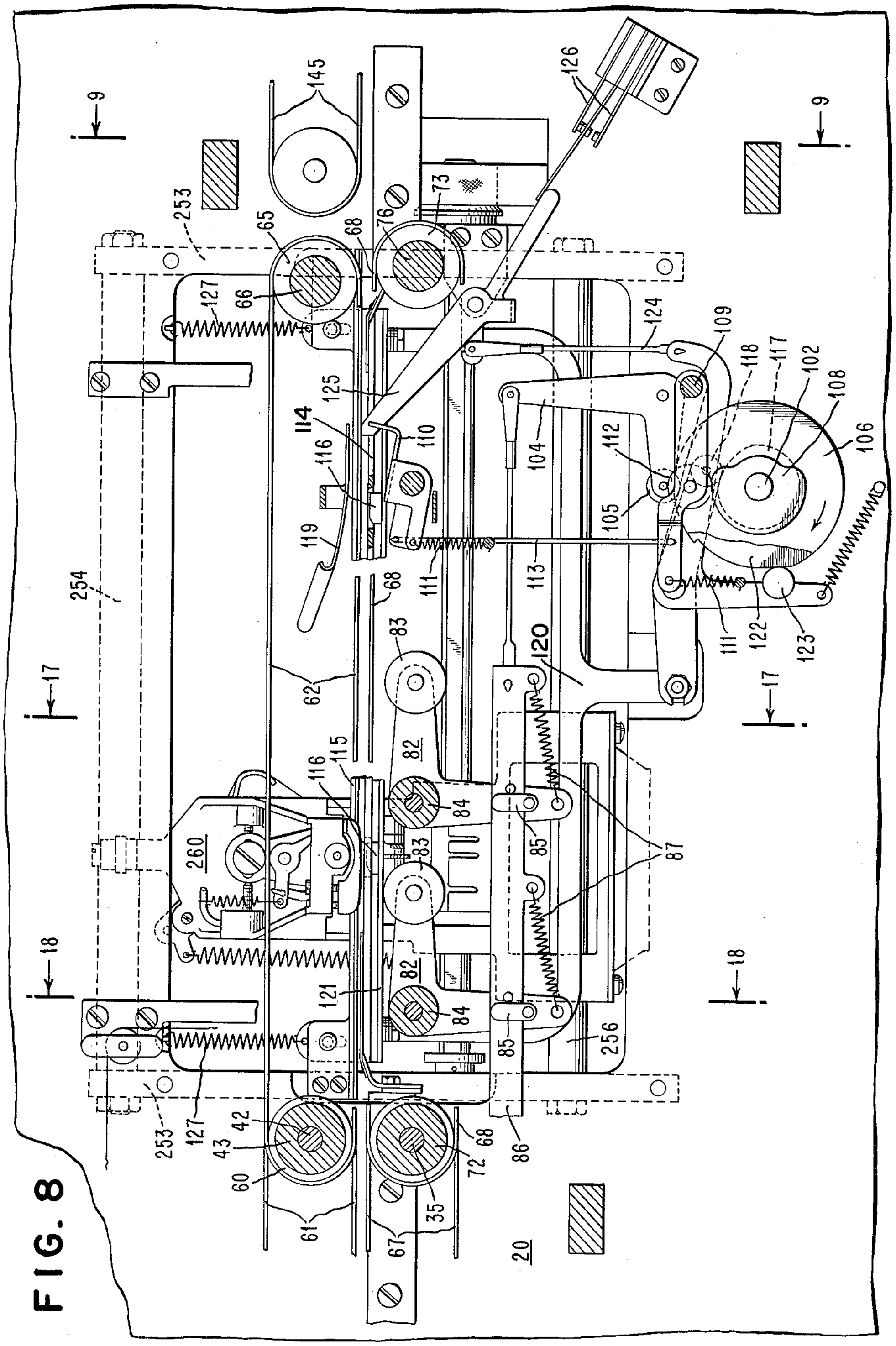
Figure 9:
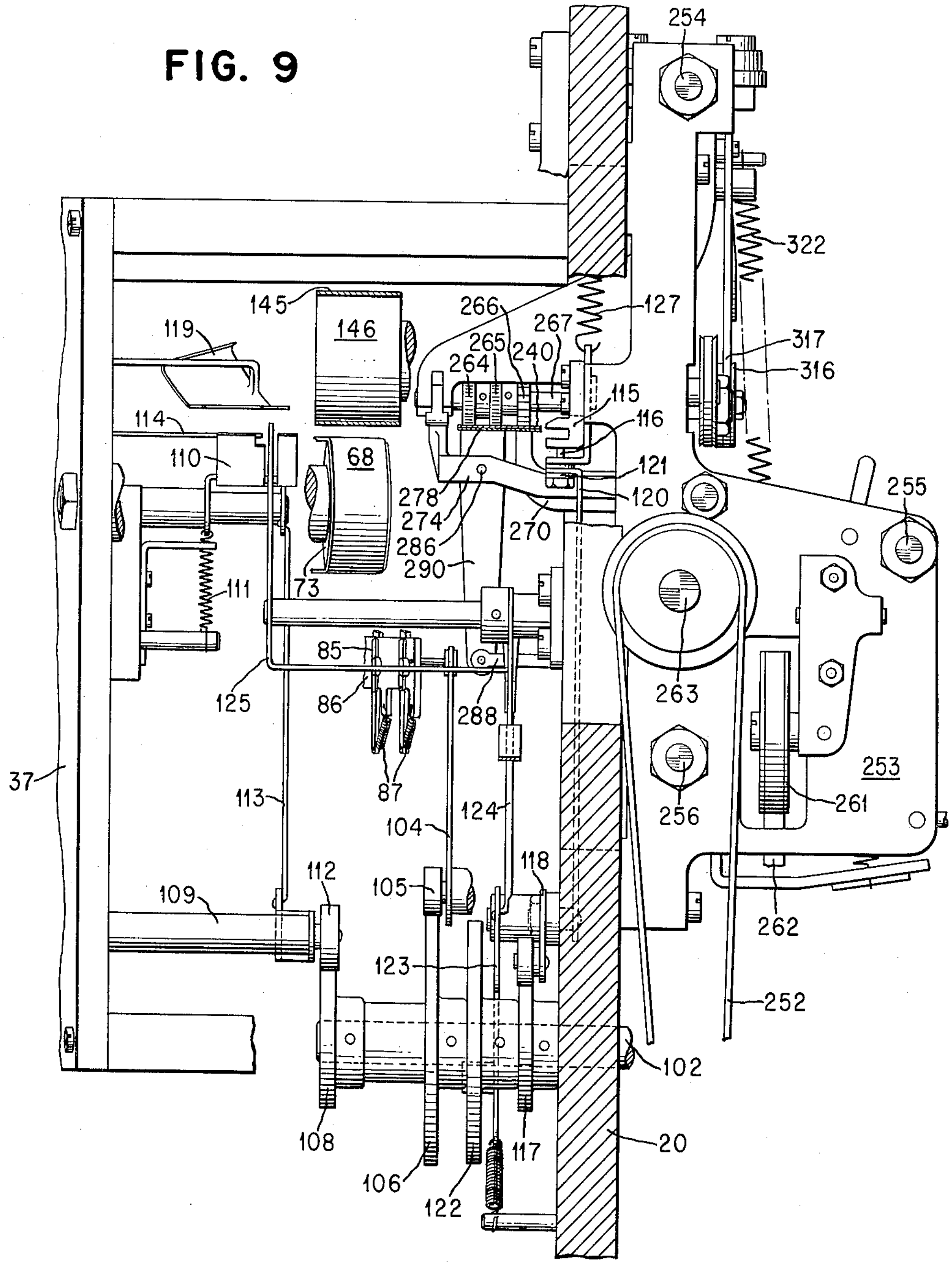
Figure 10:
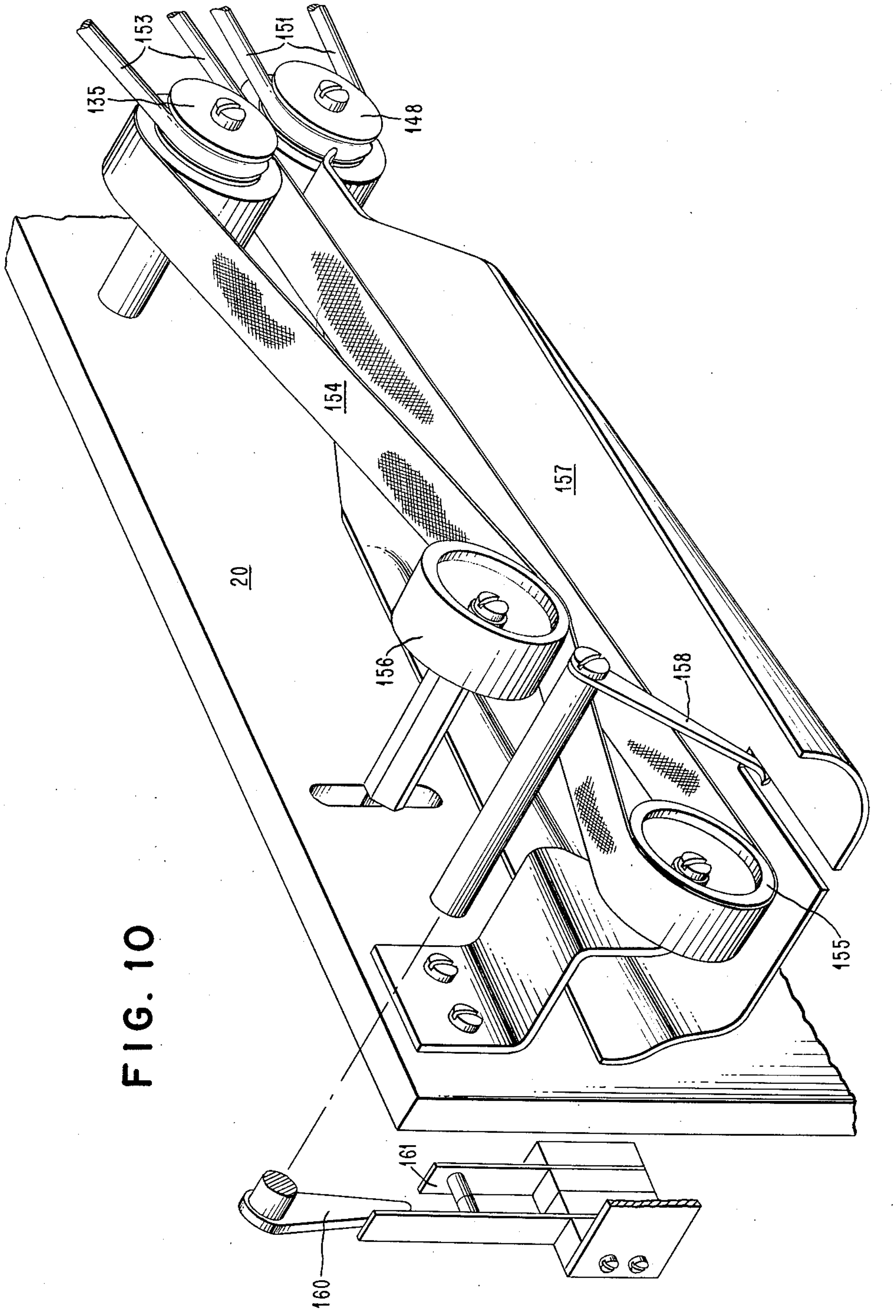
Figure 11:
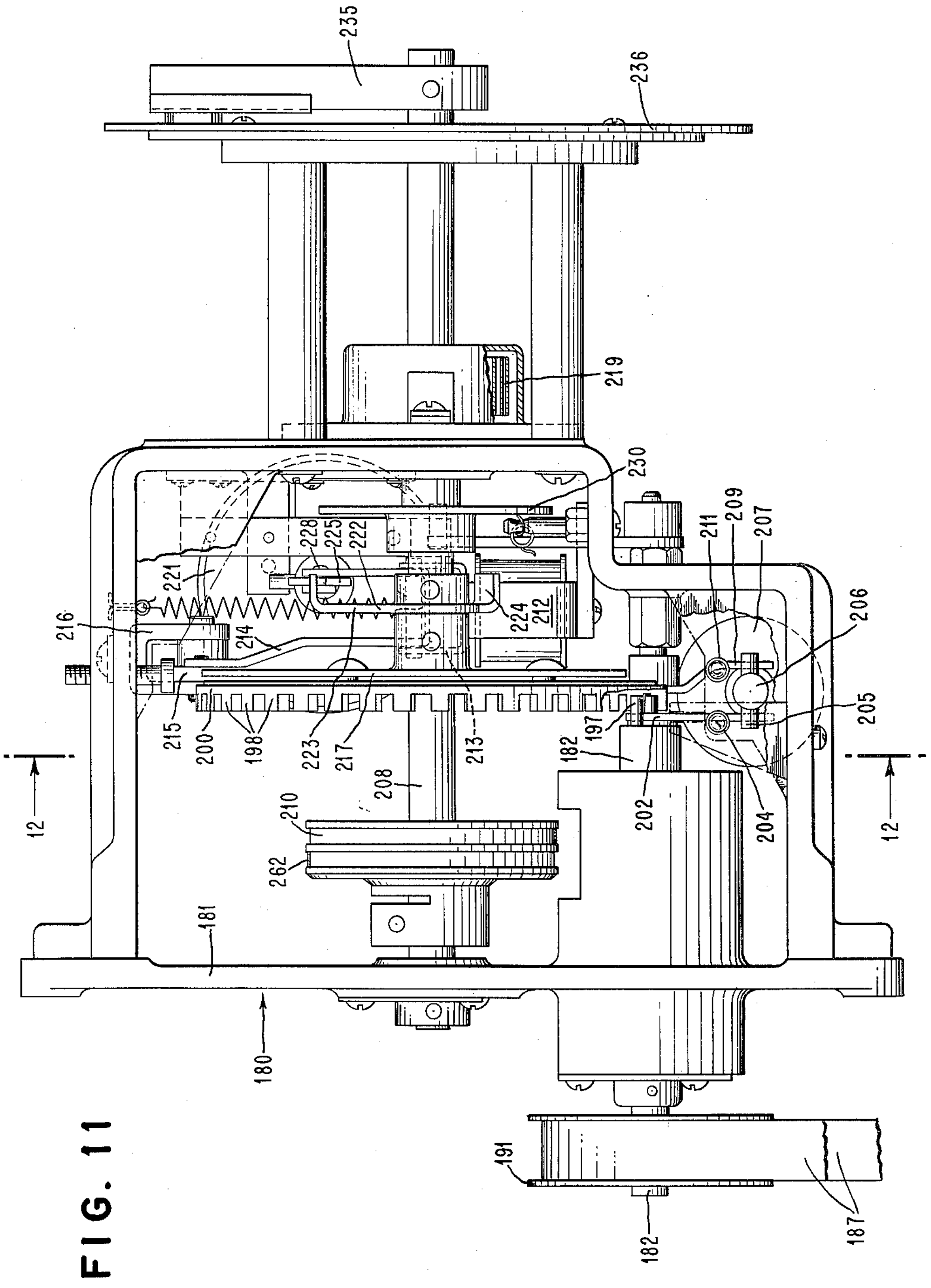

FIGS. 3 and 3A combined, form a plan view of the machine on a slightly larger scale than that of FIG. 2;

FIG. 4 is a cross section through line 4—4 of FIGS. 3 and 3A showing the index and print setup units, together with the print carriage and the feed clutch and circuit breaker cam assembly;

FIG. 5 is an enlarged detail of the pickup unit of the document feed;

FIG. 6 is a cross section taken along line 6—6 of FIG. 5 showing the feed rolls and entry chute;

FIG. 7 is a cross section taken along line 7—7 of FIG. 6;

FIG. 8 is a detail view of the print section of the machine showing the document gripper and probe and their associated mechanisms;

FIG. 9 is a cross section taken along line 9—9 of FIG. 8 showing the print wheels, gripper and probe;

FIG. 10 is a perspective view of a portion of the stacker mechanism;

FIG. 11 is a detail showing of the unit for indexing the print carriage.

Figure 12:
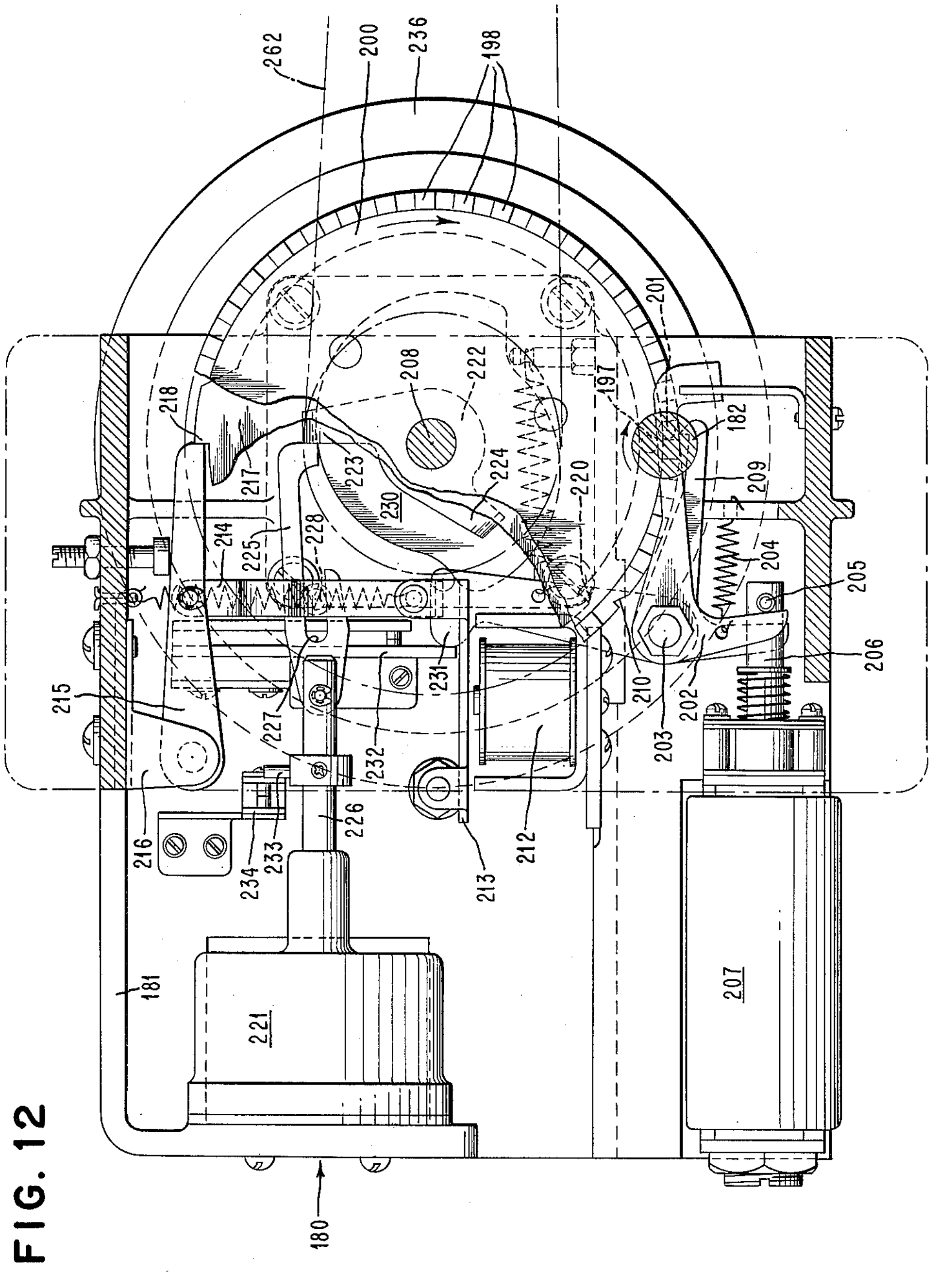
Figure 17:
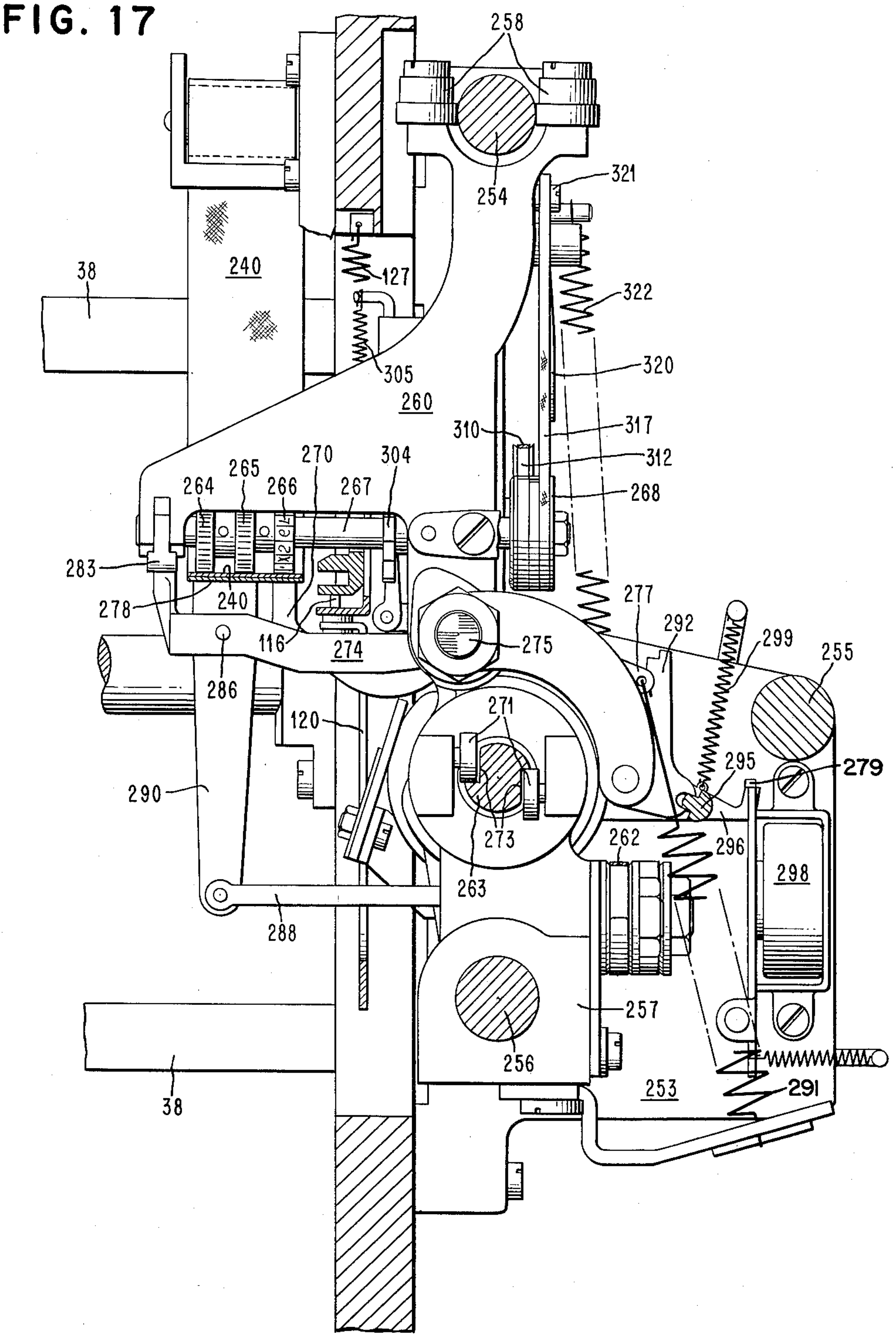
Figure 18:
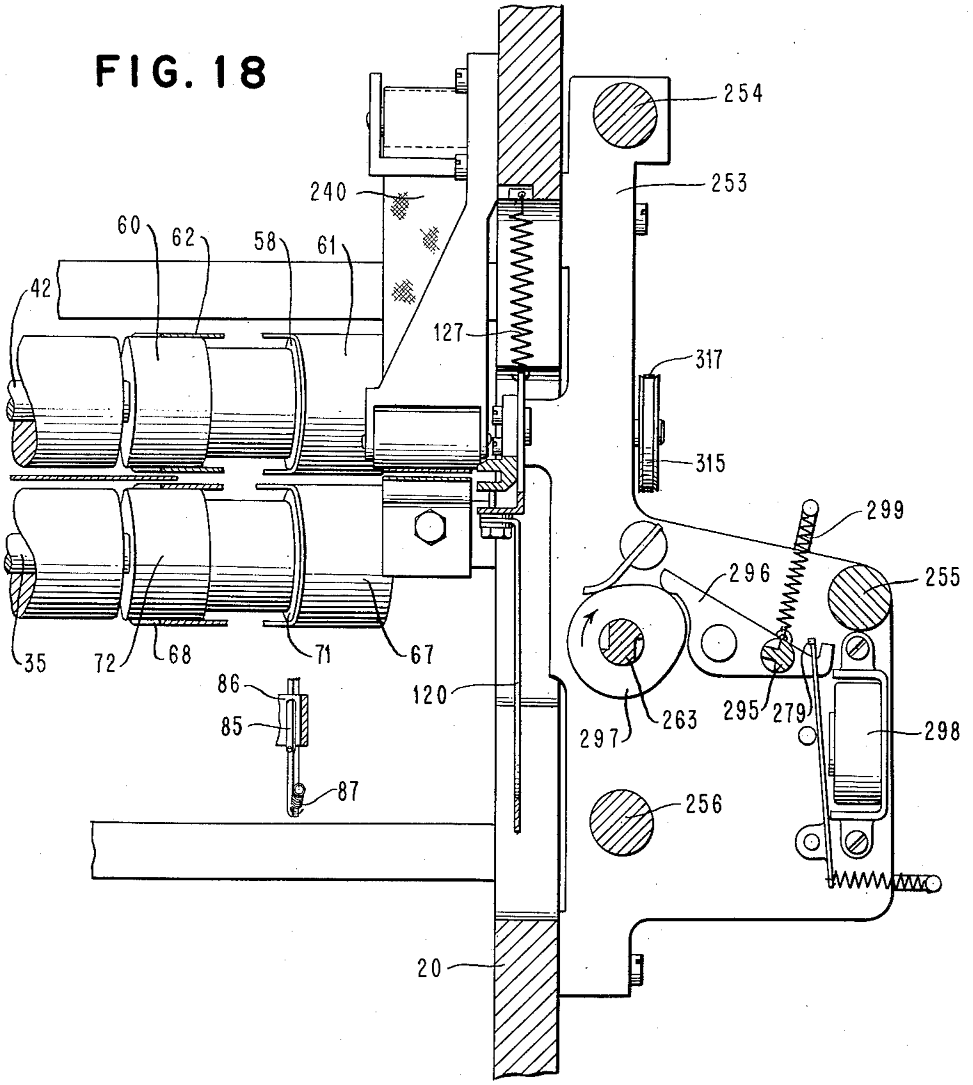
Figure 19:
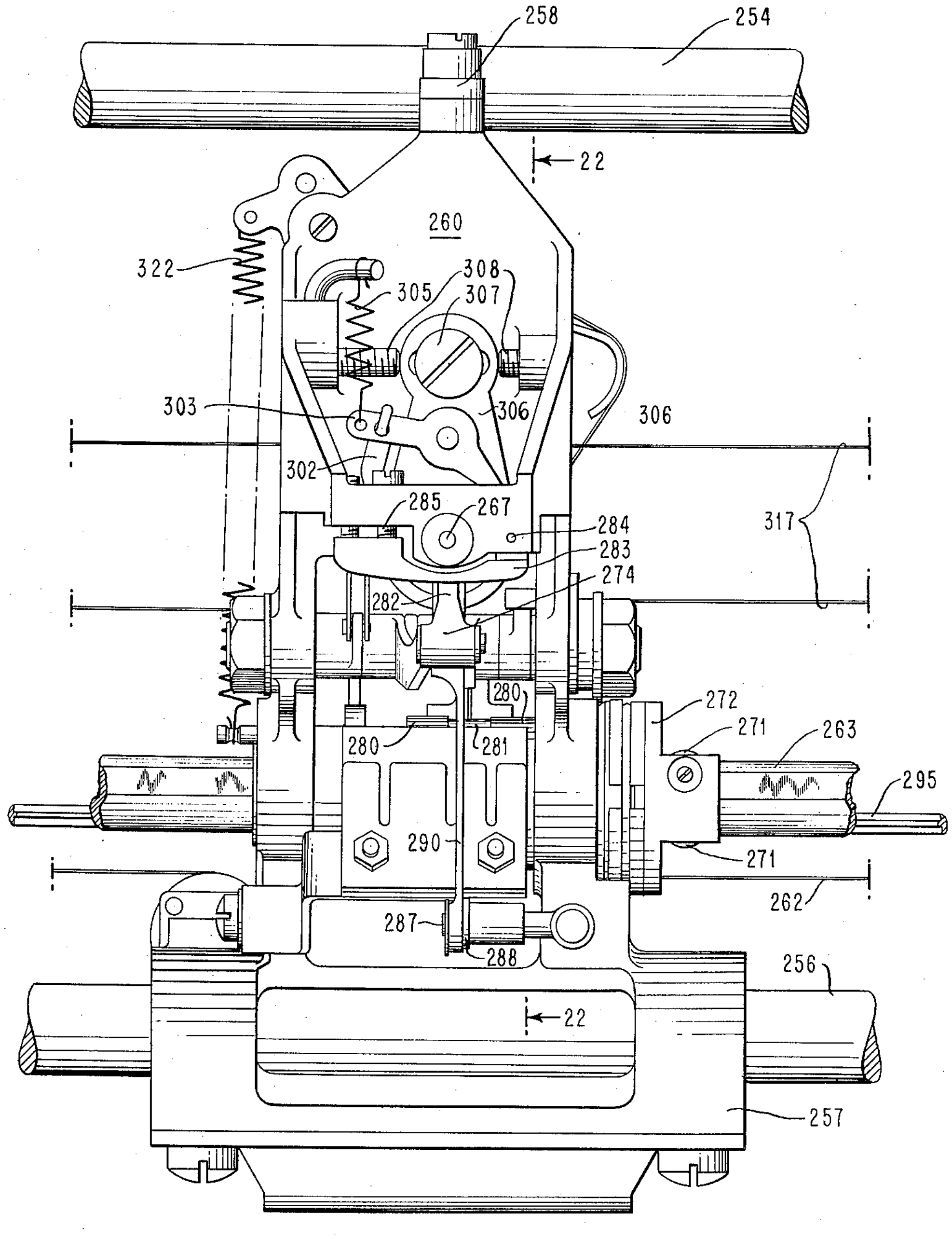
Figure 20:
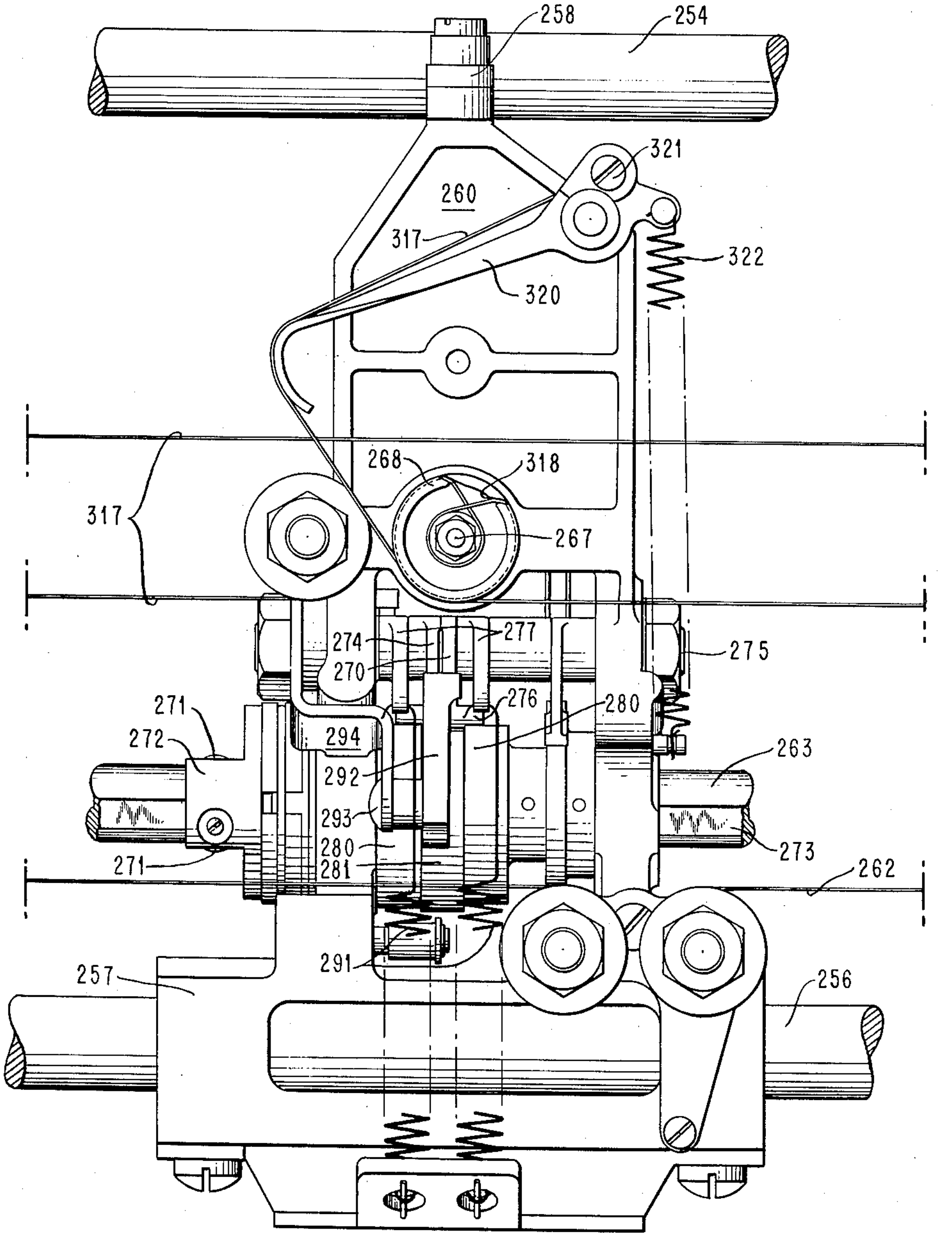
Figure 21:
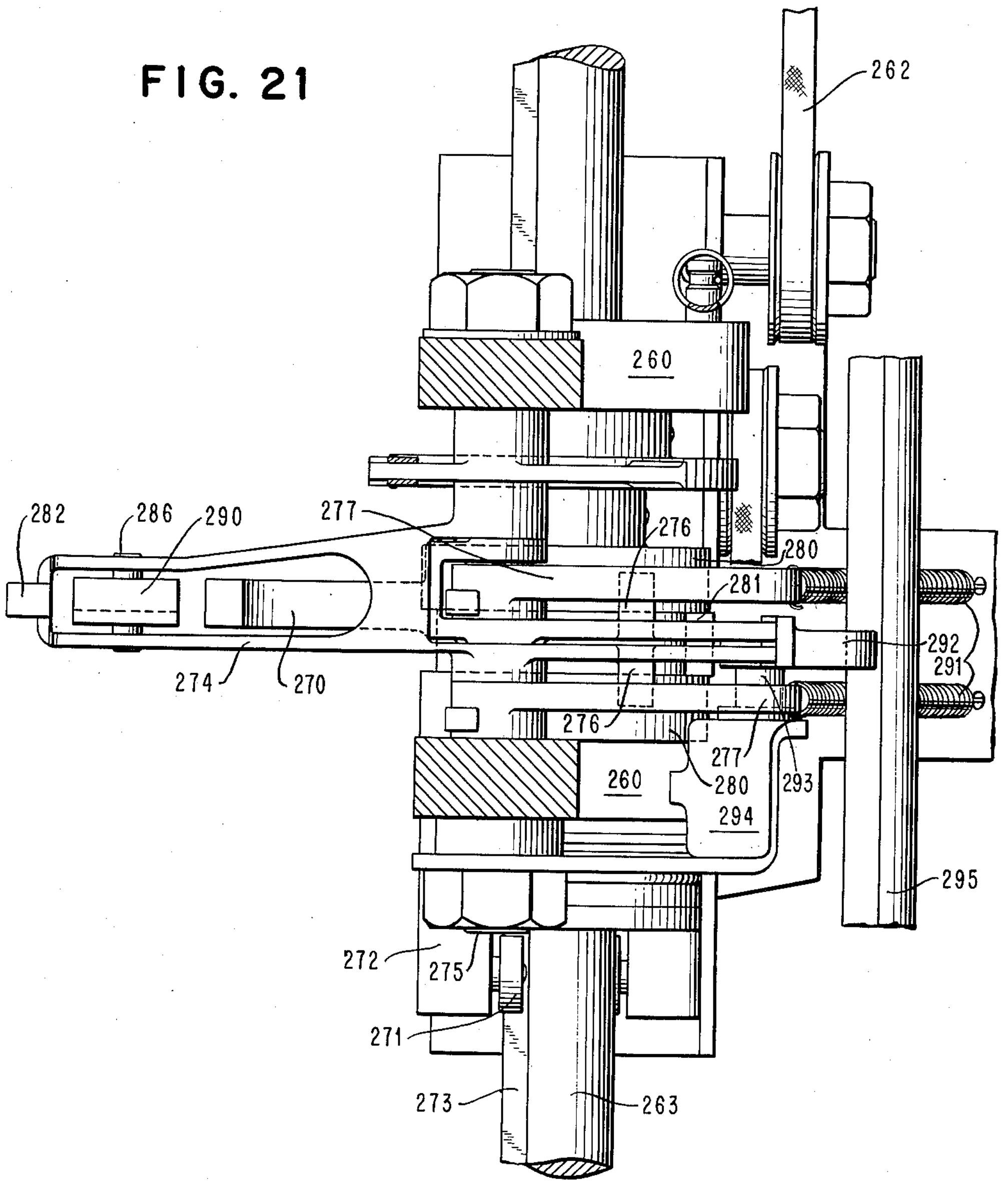
Figure 22:
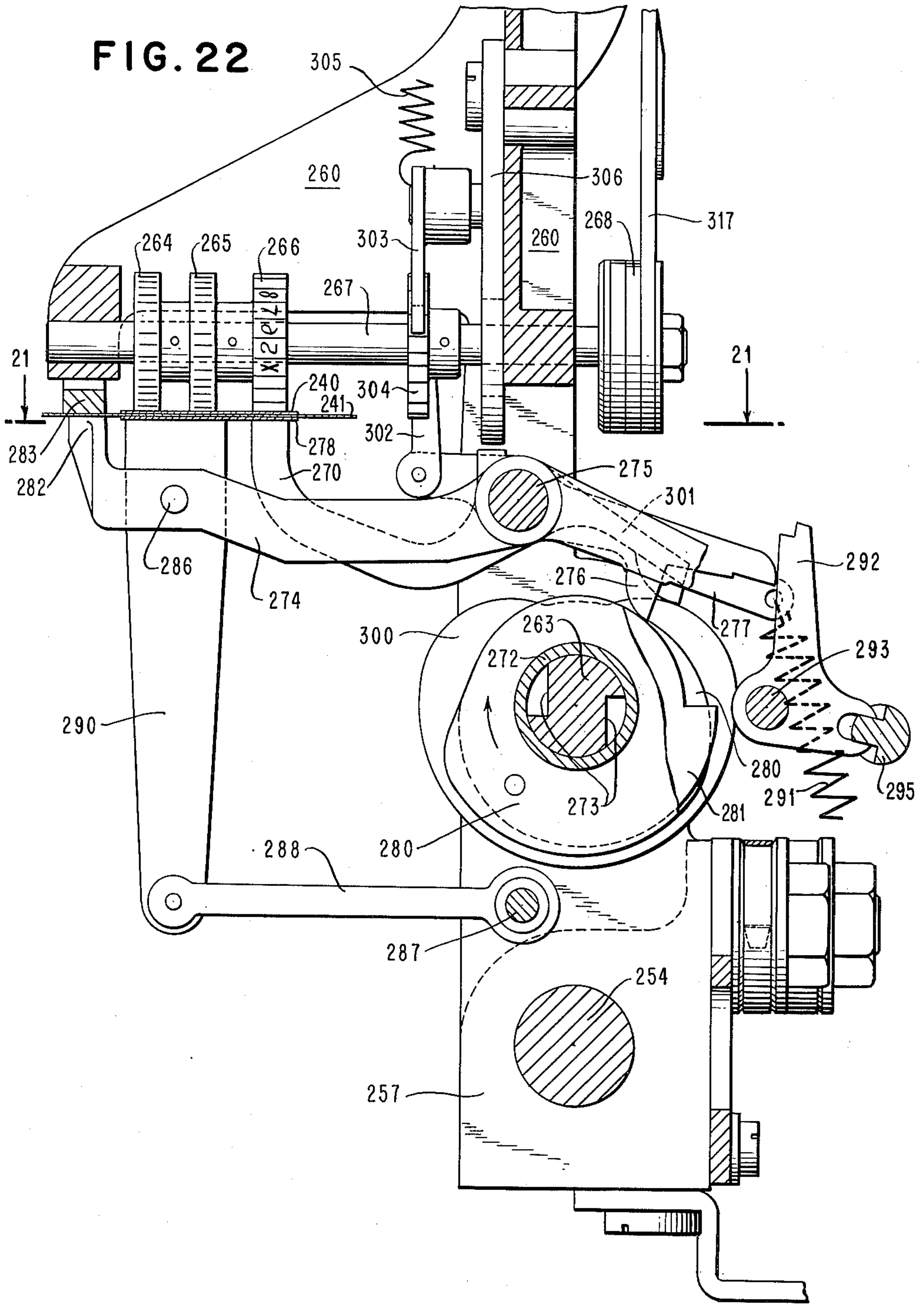
Figure 23:
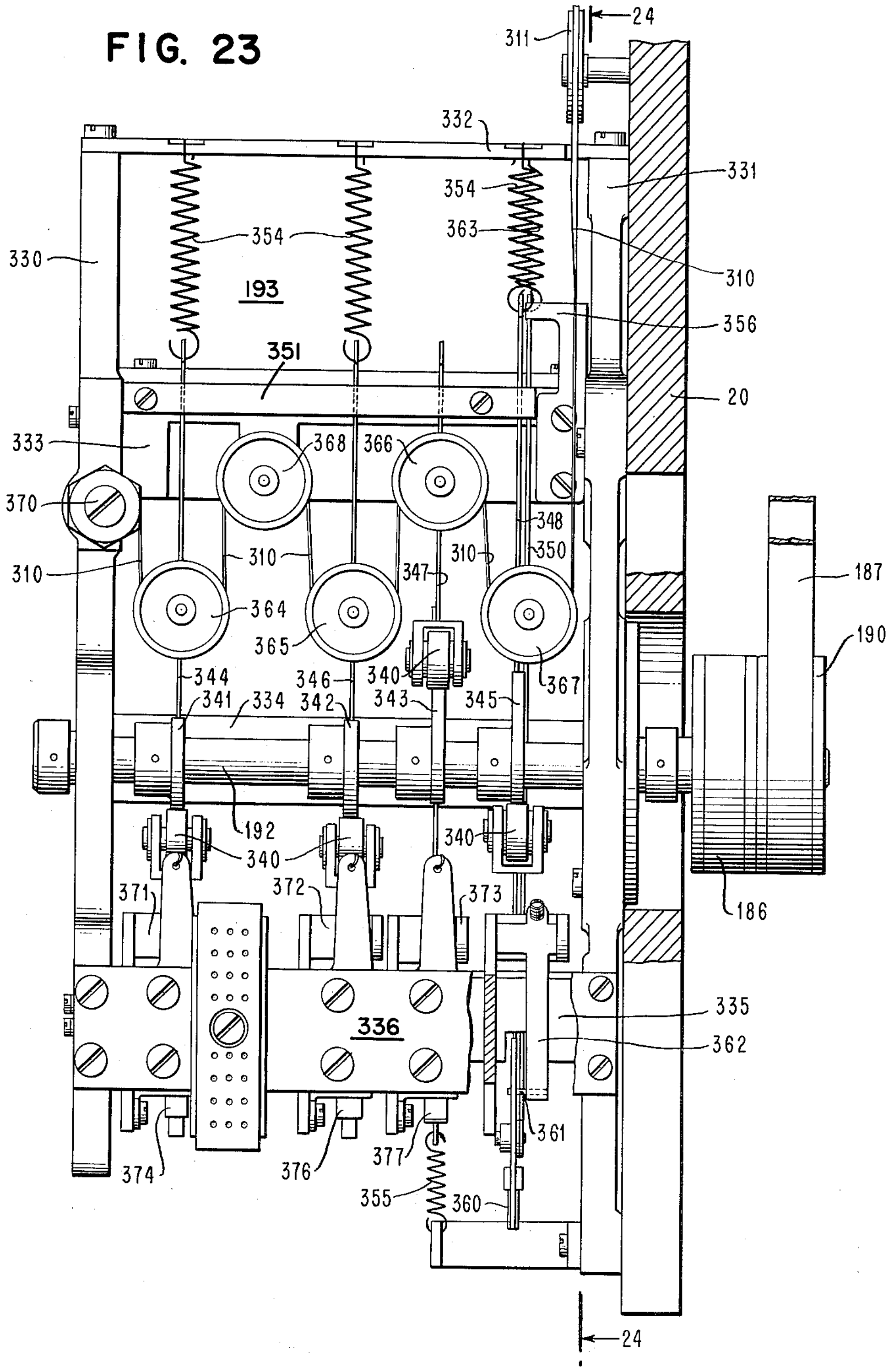
Figure 24:
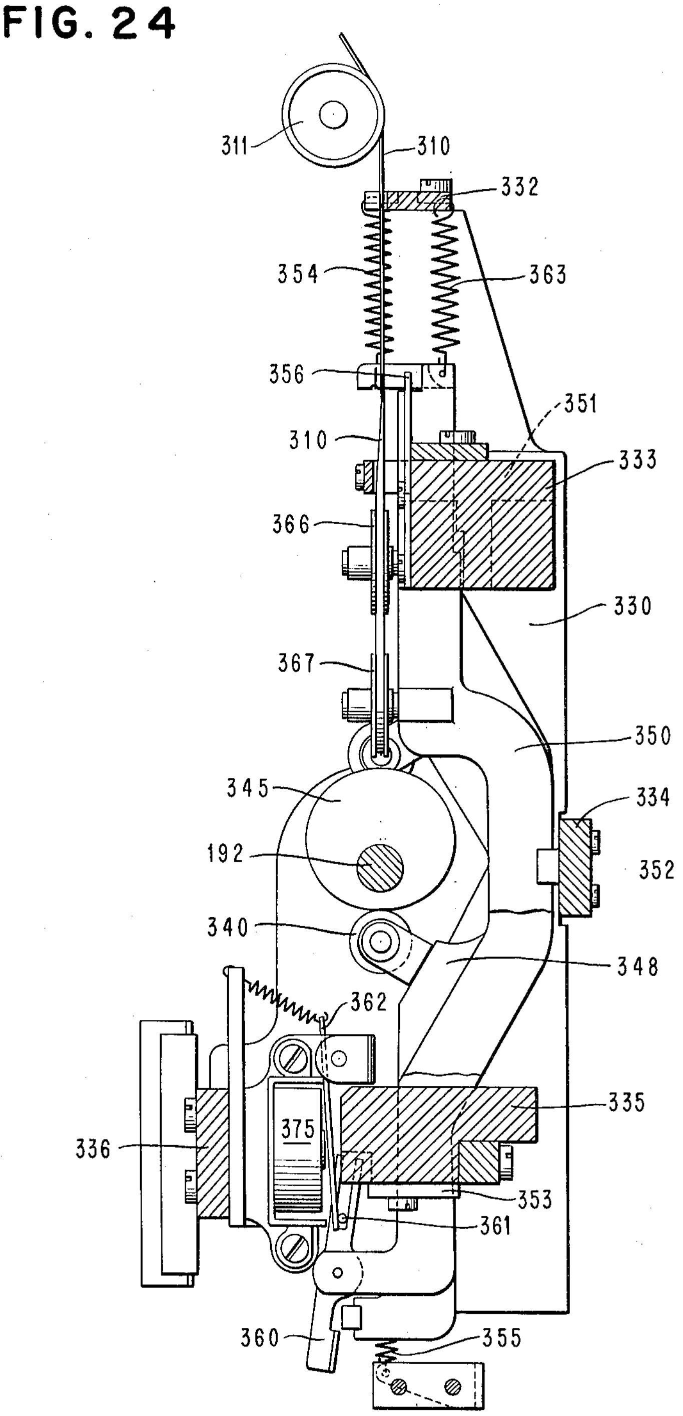
Figures 25, 26:
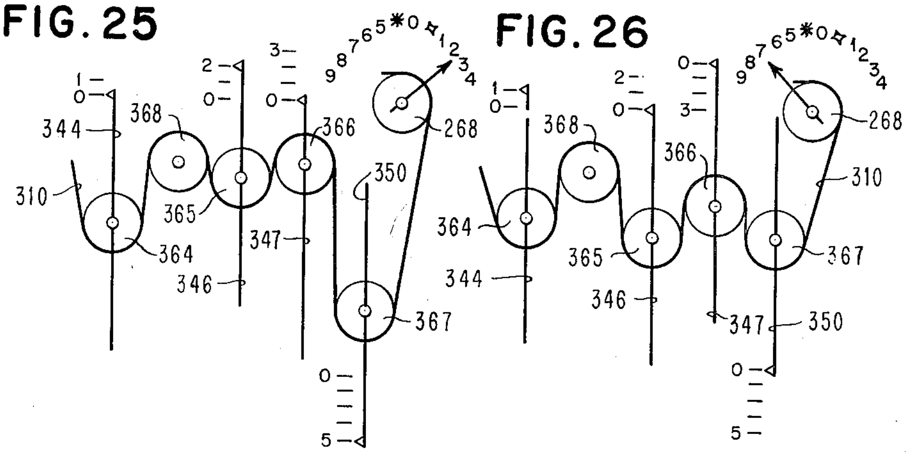
Figure 27:
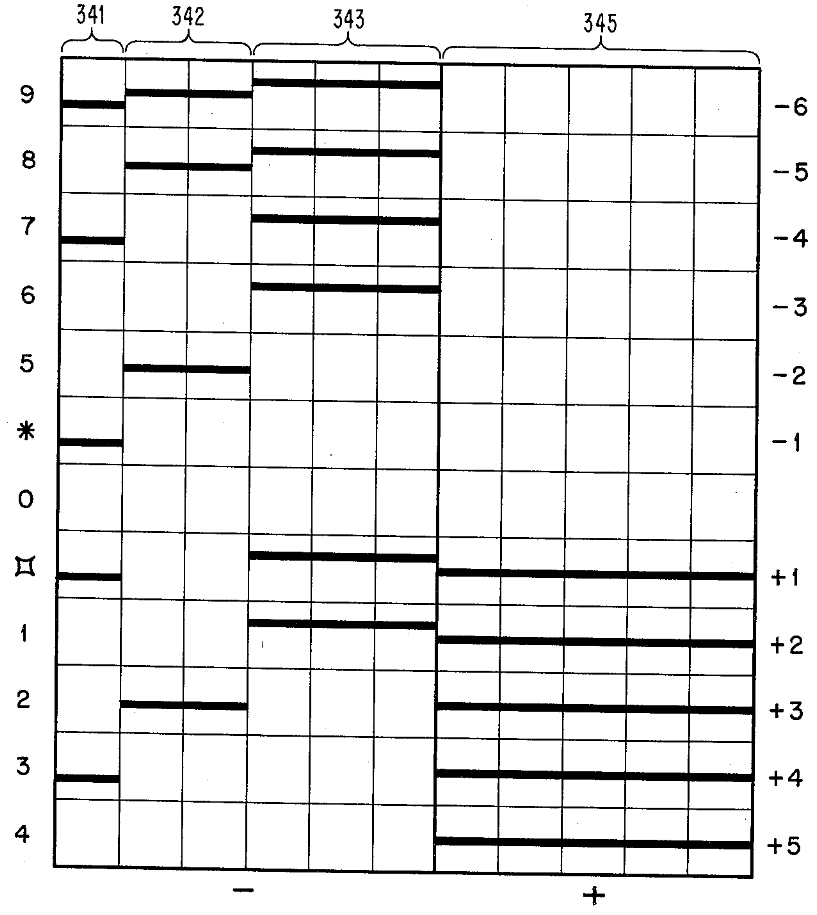
Figure 28:
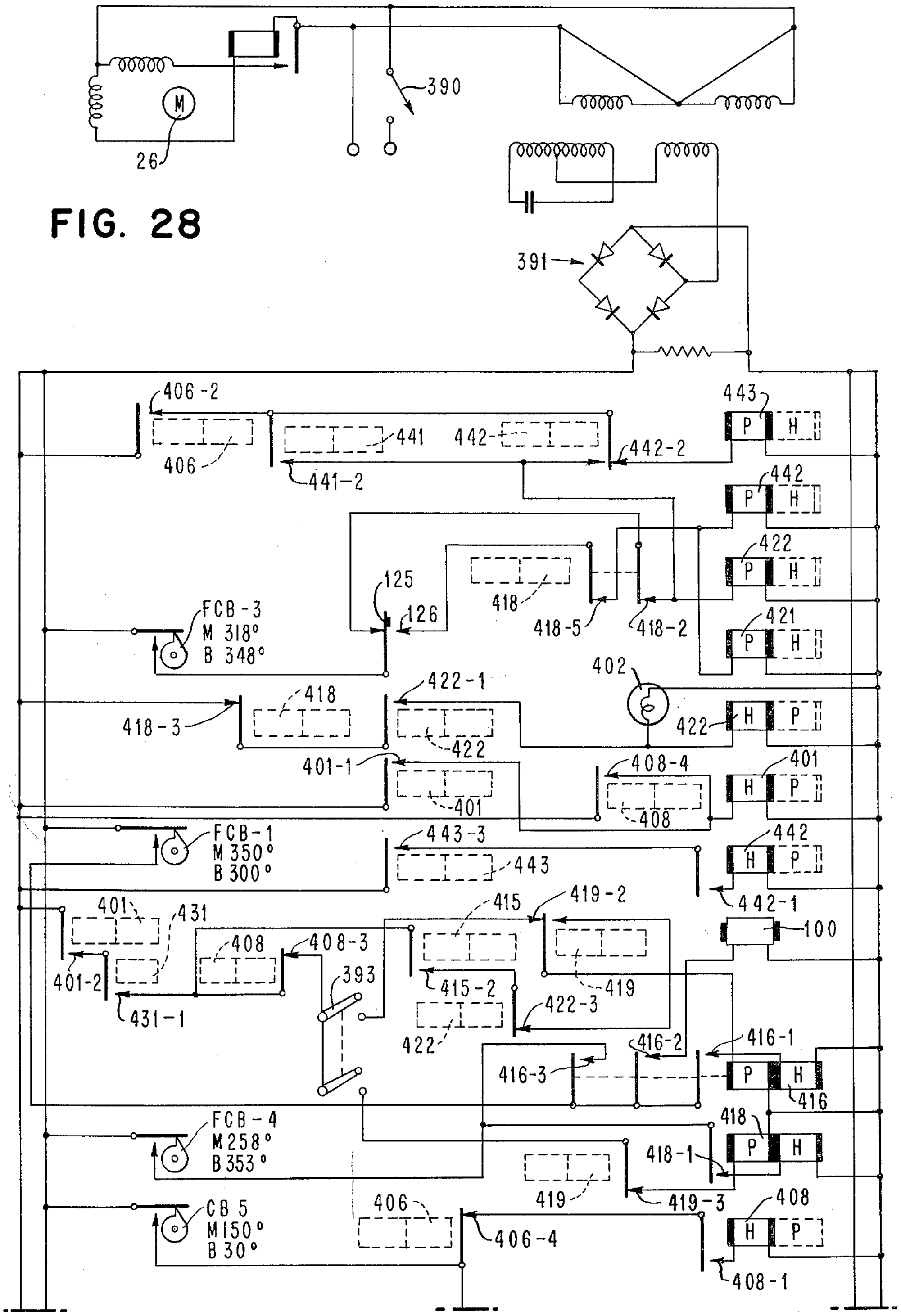
Figure 28A:
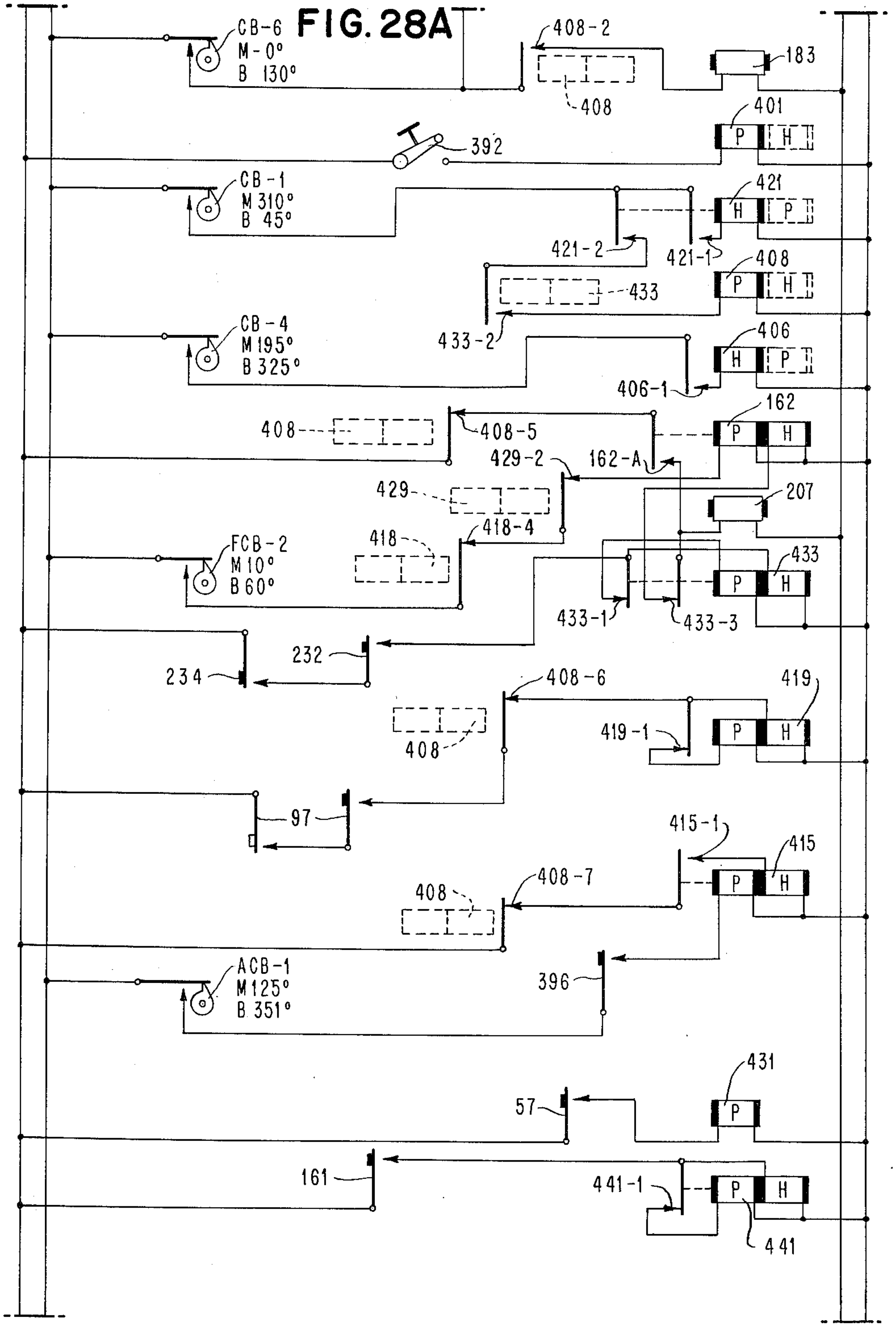
Figure 28B:
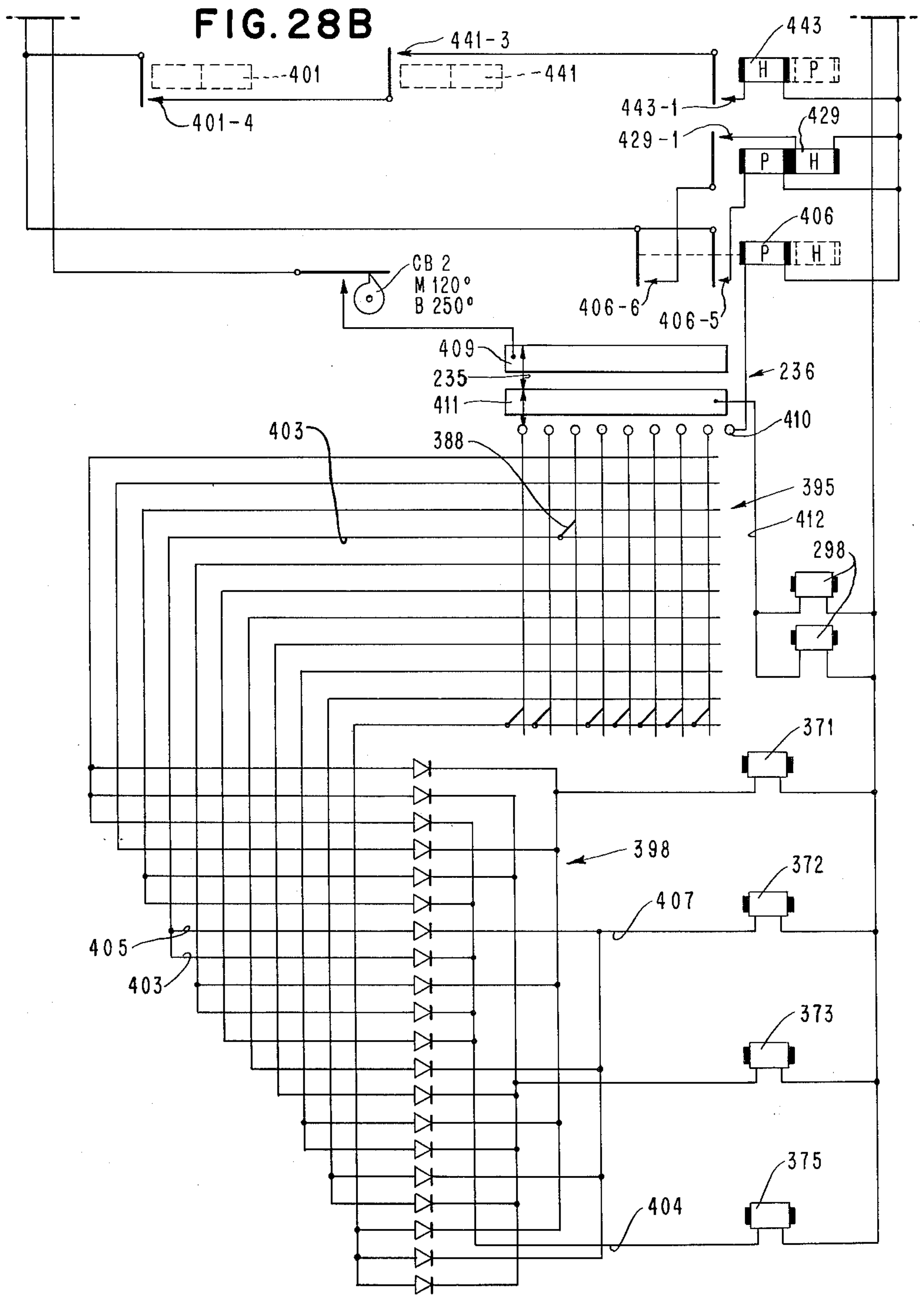
Figure 29:
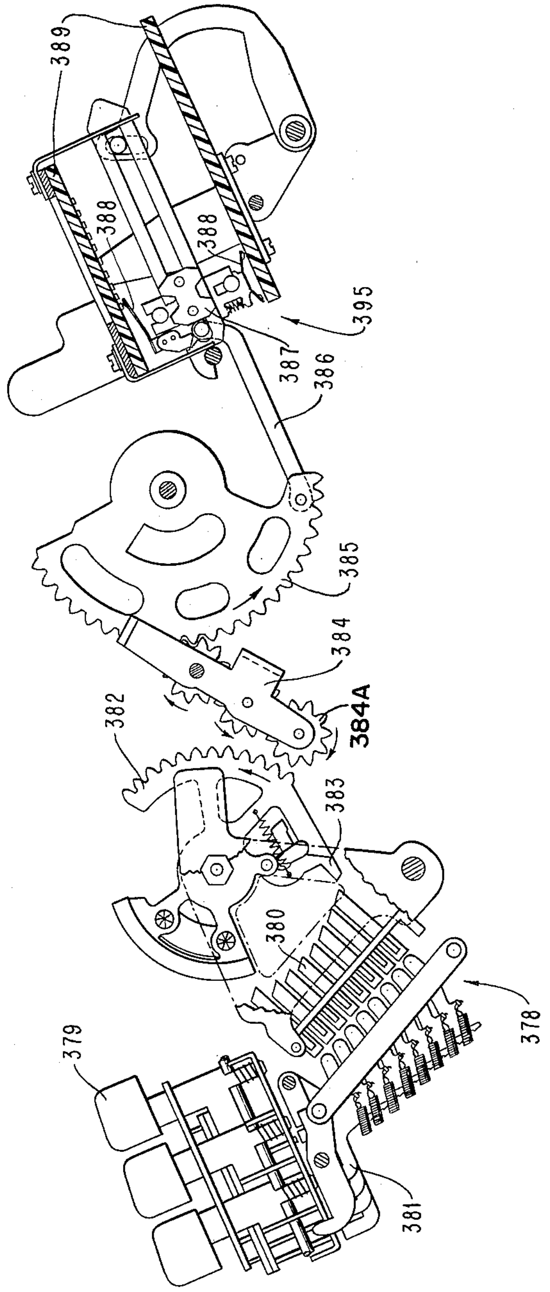
Figure 30:
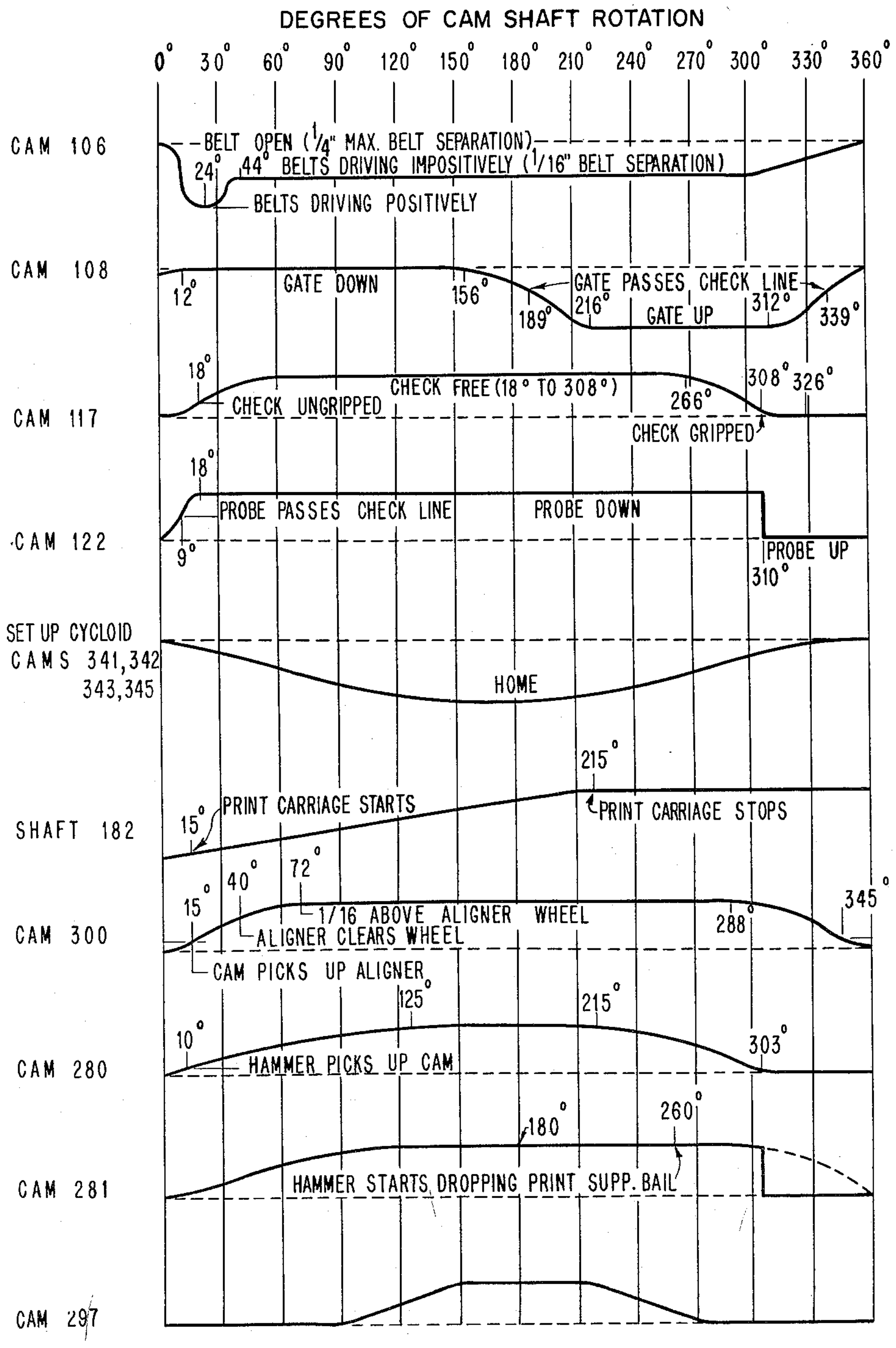

FIG. 12 is a vertical cross section taken along line 12—12 of FIG. 11, with parts broken away to show the operating cams;

FIGS. 13, 14, 15 and 16 are operational views of the improved Geneva drive for the index unit;

FIG. 17 is a cross section taken along line 17—17 of FIG. 8 showing the printing mechanism;

FIG. 18 is a cross section taken along line 18—18 of FIG. 8 showing the feed rolls;

FIG. 19 is a front detail elevation of the print carriage;

FIG. 20 is a rear detail elevation of the print carriage;

FIG. 21 is a plan view of the print carriage with a portion of the frame removed along line 21—21 of FIG. 22;

FIG. 22 is a cross section taken along line 22—22 of FIG. 19 showing the print wheels and hammer mechanism;

FIG. 23 is a front elevation of the print set up mechanism;

FIG. 24 is a side elevation of FIG. 23 with the frame removed along line 24—24 of FIG. 23;

FIGS. 25 and 26 are schematic positional diagrams of the print set up mechanism;

FIG. 27 is a diagrammatic showing of the code used in controlling the print wheels;

FIGS. 28, 28A and 28B combined, form a schematic showing of the operating circuit;

FIG. 29 is a schematic showing of the keyboard, set bar basket, actuator and storage in the adding machine;

FIG. 30 is a timing diagram for the component parts of the machine.

The machine shown in the drawings is one wherein documents such as checks of varying shape and thickness are fed to and from a printing position where data for future reference is printed. The device is referred to as an inscriber. The checks are fed individually into a slot where feed rollers grasp the document and feed it into a belt system that carries it at right angles to the original travel path. The belt system is skewed with respect to the line of travel so that the check is transported laterally as well as longitudinally against an aligning wall prior to reaching the print stage. At the print stage a gate or paper stop halts the check and grippers hold it in printing position. At this position a finger or probe senses the check to control printing and further feeding. After being printed the check is held at the print stage until the next check is inserted. At that time both checks are fed, one to the print position and the other to a stacker. Belt feeds carry the printed check to a curved plate which flexes and stiffens the check prior to being fed into the stacker.

Printing is effected by a multiple part drum mounted in a carriage which is indexed a character space at a time. The indexing continues until the carriage is at a right hand margin and remains in this position until a new check is inserted.

The feeding of a new check to the printing position initiates an operation of the indexing mechanism which returns the print carriage to one of a plurality of selected starting positions.

The print drum is positioned by a setup mechanism comprising a plurality of slides carrying pulleys over which a cable fastened to the print drum is passed. The slides are reciprocated to shorten or lengthen the cable thus rotating the drum to the desired type character position. The setup mechanism is under control of a key storage and the keyboard of an adding machine. Amounts entered in both storage and adding machine are transmitted to the setup mechanism in the form of pulses.

Figure 1:
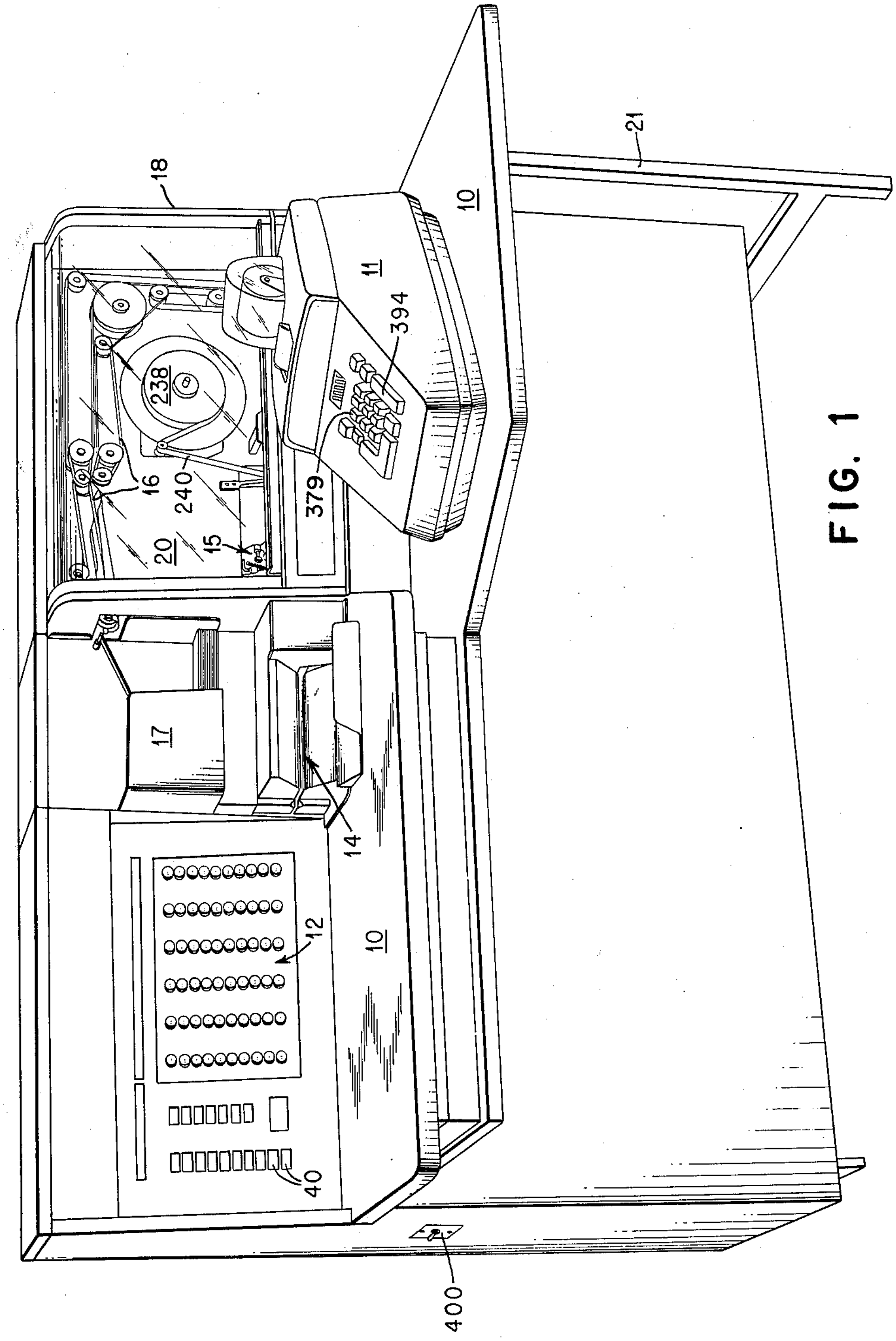
FIG. 1 is a perspective view of the machine embodying the invention.

Referring to FIG. 1 which shows the machine with the covers on, it will be seen that shelves 10 provide a place for documents and an adding machine 11. At 12 is a keyboard for entering preset permanent data to be stored and then printed. The documents are inserted in a slot 14 and carried to the print mechanism 15 and thence by belt conveyor 16 to the pocket 17. All of the mechanism of the machine is mounted on a vertical frame plate 20 (FIGS. 2 and 3) secured to a horizontal frame 18 supported by legs 21. Mounted on frame 20 are two castings 22 and 23 (FIG. 6) forming slot 14 and in which are mounted for rotation, feed rollers 24 and 25. Rollers 24 are driven by the main drive as follows: A motor 26 (FIG. 3A) secured to plate 20, drives an auxiliary drive shaft 27 carried in a bearing 28 secured to the back of frame 20, through a belt 30 and pulley 31. Secured to the other end of shaft 27 is a pulley 32 which drives a pulley 33 through belt 34. Pulley 33 (FIG. 2) is secured to a stub shaft 35 mounted in a frame plate 37 mounted at an angle to the main plate 20 by posts 38 (FIG. 3A). Secured to stub shaft 35 is a pinion 40 meshing with a pinion 41 secured to a drive shaft 42 carried in a bearing 43 secured to the plate 37. The shaft 42 carries pulleys for feed belts which will be described later. Also secured to shaft 42 is a pulley 44 which drives a pulley 45 through a belt 46. Pulley 45 is a double pulley and is mounted on a stub shaft 47 carried by the frame 37. The outer groove of pulley 45 is connected by a belt 48 to a pulley 50 secured to a shaft 51 carrying the feed rolls 24. The belt 48 is carried over idler pulleys 52 to effect a ninety degree turn in the drive. It is apparent that the motor will drive the feed rolls 24 through the above belts and pulleys.

The casting 23 (FIG. 6) carrying the feed rolls 25 is pivotally mounted on the plate 20 by brackets 53 and rod 54 in such a manner as to permit the casting and the rolls 25 to be rocked down and away from contact with rolls 24 thus permitting easy access to any feed trouble. Casting 23 is provided with an ear 55 which extends through plate 20. Mounted on the back of plate 20 is a spring pressed plunger 56 which bears on the ear 55 to hold the casting 23 is proper relation with the casting 22. In the normal or closed position the ear 55 closes a contact 57 to complete the circuit for the feed clutch as will be described later.

The belt drive described above rotates shaft 42 (FIG. 3) to which is secured pulleys 58 and 60 over which are passed flat bands 61 and 62 of any well known friction material such as rubber impregnated fabric or rough cotton. The other end of band 61 passes over an idler pulley 63 mounted in a bracket 64 secured to frame 20. A similar idler 65 (FIG. 3A) mounted on a stub shaft 66 secured in frame 37 supports the other end of band 62. Positioned below bands 61 and 62 (FIG. 8) and parallel thereto are similar bands 67 and 68. Band 67 is carried on idler 70 (FIG. 5) and driven by pulley 71 secured to shaft 35. Also secured to shaft 35 is a second pulley 72 (FIG. 8) for driving band 68 which is carried on idler 73. Idler 70 is mounted in a bracket 74 secured to frame 20 and idler 73 is mounted on a stub shaft 75 secured in plate 37.

Fastened to frame 20 (FIG. 5) are two brackets 77, in each of which is secured a stub shaft 78 of which is pivotally mounted a bell crank 80 carrying a roller 81. The bell cranks are so positioned that the rollers 81 lie within the loop of band 67. Similar bell cranks 82 and rollers 83 (FIG. 8) mounted on stub shafts 84 are positioned within the loop of band 68. The depending arm of each bell crank is provided with a guide member 85, for a link 86 which is resiliently connected to each bell crank by a spring 87. The link upon being drawn to the right by a cam as will be described later, will rock rollers 81 and 83 into resilient contact with the under side of bands 67 and 68 thus raising the bands into contact with the driver bands 61 and 62. A document between the bands will be fed regardless of the thickness.

Pivotally mounted on a stub shaft 88 fastened in the casting 23 (FIG. 6) is a lever 90 having a pin 91 in its lower end connected in the end of link 86. The upper arm of lever 90 is also provided with a pin 92 which rides in an arcuate slot in a bail 93 pivoted at 94 and carrying the feed rolls 25. The bail is urged counterclockwise in FIG. 6 by a leaf spring 95 thereby maintaining rolls 25 in contact with rolls 24. Rocking of lever 90 will rock rolls 25 away from rolls 24. Thus it will be seen that a document presented to the constantly rotating feed rolls 24 and 25 will be carried into the machine until it reaches a pair of button shaped members 96 (FIG. 5). A button 96 is secured to one spring of a pair of contacts 97, both of which must be closed to actuate a drive for the cam above referred to. Upon closure of both contacts the cam will draw link 86 to the right thus rocking rolls 25 away from rolls 24 removing the lateral drive, and bell cranks 80 and 82 will rock rollers 81 and 83 into contact with bands 67 and 68 and the document will be released by rolls 24 and 25 and fed by bands 67 and 68 at right angles to the original feed into a position where data may be printed on a predetermined portion of the document. Referring to FIGS. 3 and 3A, it will be noted that the bands 61, 62, 67 and 68 are positioned at a decided skew angle. This is done to insure that a document will be transported laterally as well as longitudinally into horizontal alignment with plate 20.

The drive for the cam above referred to is controlled by an electromechanical feed clutch 100 (FIG. 4). Since the clutch forms no part of the novelty of the invention, it will not be described in detail except to state that it is a one revolution type controlled by an electromagnet and may take any suitable configuration. The clutch is driven by the motor 26 through a belt 101, and when engaged, will drive a shaft 99 which in turn will drive shaft 102 through belt 103.

Shaft 102 (FIGS. 8 and 9) has secured thereon, four cams for controlling the operation of the document gripper, document probe, gate and document entry or feed. The last cam, that for controlling the feed through link 86, has been mentioned above. This link is connected to a bell crank 104 which has a cam follower roller 105 engaging a cam 106 on shaft 102. The follower is held in engagement with the cam by a spring 107 (FIG. 5) drawing the link 86 to the left. A cam 108 controls a gate 110 which is raised in the path of the document as it reaches the print position. Gate 110 is pivotally mounted on the back of plate 37 (FIGS. 8 and 9) and is connected to a cam follower 112 by a link 113. The cam follower is pivotally mounted on a stud shaft 109 secured in the plate 37 and is held in contact with the cam by spring 111. Should a document fail to clear the gate upon being fed from the printing position the spring 111 is so designed that the document will not be damaged when the cam 108 permits the gate to close.

Located adjacent the print position and secured to the rear of plate 37 is a table 114 approximately level with the under portion of the loop of band 62 and is adapted to form a platform on which the document rests during printing. The gate 110 when rocked into effective position, abuts the forward or right hand end of the table and holds the document until it can be gripped. A guide member 119 is provided at the stop position to prevent curling and insure contact by the edge of the document with the stop. Adjacent the print carriage and horizontally aligned with the table 114 is a grooved guide 115 (FIG. 9) secured to the plate 20. As the document is fed by the bands 62 and 68 onto the table 114, the inner edge enters the guides 115 and 119 and proceeds until stopped by the gate 110. Immediately thereafter two grippers 116 acting in slots in the guide 115 are raised by springs 127 under control of a cam 117. This cam acts through cam follower 118 which is attached to a Y shaped member 120 in turn fastened to a bar 121 carrying the grippers 116. This action grips the document and holds it firmly during printing. A cam 122 through follower 123 and link 124 rocks a finger or probe 125 forward as shown in FIG. 8 to sense the presence or absence of a document at the printing position. A tail on finger 125 makes one of two contacts 126 depending upon the presence or absence of a document. Normally the finger is out of the path of and contact with the document being work on.

Referring to FIG. 30 it will be seen that the sequence of operations effected by the above cams is as follows: At about 24° of the feed cycle, the cam 106 brings rollers 81 into position whereby the document is positively gripped by the bands 61 and 67. By the time the document reaches bands 62 and 68 the cam does not rock rollers 83 against band 68 as firmly, thus permitting a certain amount of slippage between bands and document. At about 200° the gate 110 enters the path of the check and at about 216° is full up. At about 308°, thus allowing sufficient time for the document to settle against the stop, the cam 117 raises the grippers 116 to hold the document during printing. At about 310° the cam 122 causes the probe 125 to rock, sensing the presence of the document to prepare circuits whereby the printing may be effected. Since the printing may take an indeterminate time, the document is held at the print station until the next document trips off the feed clutch 100 by closing contacts 97. At about 12° the gate 110 is lowered thus opening the feed path. At approximately 18° the grippers 116 are lowered and the bands 62 and 68 feed the document into the bands of the stacker feed.

The stacker bands (see FIGS. 2, 3 and 3A) are similar in form to bands 61, 62, 67 and 68, but differ in that they are continuously running and are constantly in contact with each other. Fastened to drive shaft 27 is a pulley 130 about which is wrapped band 131 that is carried on idlers 132, 133 and 134 and pulleys 135, 136 and 137, all of which are mounted on the plate 20; idler 132 being adjustable to tension the system. The band pulleys 136 and 137 each have a groove cut therein for a belt 138 which besides being wrapped partially about each pulley, drives pulleys 140—141 and 142—143. Pulleys 141 and 142 carry a band 144 which contacts band 131 forming a vertical feed path. Pulley 140 carries a band 145 which is wrapped around an idler pulley 146 and forms a feed path with band 131. Pulley 143 carries a similar band 147 wrapped around a pulley 148. Pulley 148 is connected to a feed roll 150 by a belt 151. Pulley 135 is connected to a second pulley 152 by a belt 153. Pulley 152 carries a band 154 which is carried around an idler 155 (FIG. 10) and under a second adjustable idler or tension roller 156.

In this portion of the feed, the band 154 does not cooperate with a second band as previously, but with a dished plate 157 which extends from the feed roll 150 to a point adjacent the stacker pocket 17. The plate 157 is so shaped that a document fed over its surface by band 154 is flexed into a partial concave fold or curl which stiffens the paper permitting it to be ejected by dropping into the pocket. In stiffening the document it insures that it will rock the finger 158 in turn rocking a lever 160 to open a contact 161 thus indicating the passage of the document. A concave portion 159 is provided to prevent the smearing of the printing on the document while passing over the plate 157. From the above it will be seen that a document leaving the print position will be carried by co-acting bands 145 and 131, roller 137 and band 131, bands 144 and 131, roller 136 and band 131, and bands 147 and 131 to the feed roll 150 and then by band 154 over plate 157 into the stacker pocket 17.

After being printed upon a document remains in the print position until the next document is fed. The print carriage 15 remains in the position to which it was indexed during the prior printing.

The unit for indexing the print carriage is shown in FIGS. 3, 4, 11 and 12 and is designated 180. The mechanism is carried in a box-like frame 181 fastened to the rear of plate 20. A drive shaft 182 is journalled in frame 181 and driven through a print clutch 183. This clutch is a one revolution type similar to the feed clutch 100 and is driven by belt 184 from the pulley 185 on the drive shaft of motor 26. The clutch is connected in driving relation by belts 186 and 187 and pulleys 188, 190 and 191 as indicated in FIG. 2. The pulley 190 is secured to the drive shaft 192 of print setup mechanism 193. Also connected to the print clutch by belt 194 and pulley 195 is a cam actuated circuit breaker 196.

Shaft 182 of the index unit has an eccentric pin 197 formed on the end thereof as shown in FIG. 12 which is adapted to cooperate with teeth 198 formed at right angles to the surface of a disc 200. The teeth and disc cooperate with pin 197 to give a Geneva action wherein the drive accelerates and decelerates evenly with a dwell between. In normal position as shown in FIG. 12 the pin 197 is inside and free of the teeth 198. The disc 200 is held from rotation by a pin 201 carried in a holding pawl 202 pivoted on a stub shaft 203 and biased in a counterclockwise direction by a spring 204 against a limit pin 205 on a plunger 206 of a solenoid 207.

Mounted on the stub shaft 203 is a safety pawl 209 (FIG. 13) which, if the print clutch fails to release, will engage a notch 210 formed in a blank space on the periphery of disc 200 and prevent further rotation of the disc. The pin 197 can then rotate idly in the black space adjacent the notch. This pawl is also biased in a counterclockwise direction by a spring 211 and is adapted to be engaged by the pin 205 in the plunger of solenoid 207. To return the carriage the solenoid 207 is actuated moving plunger 206 to the left withdrawing pin 201 permitting the disc 200 to return to normal.

Figures 13, 14, 15, 16:
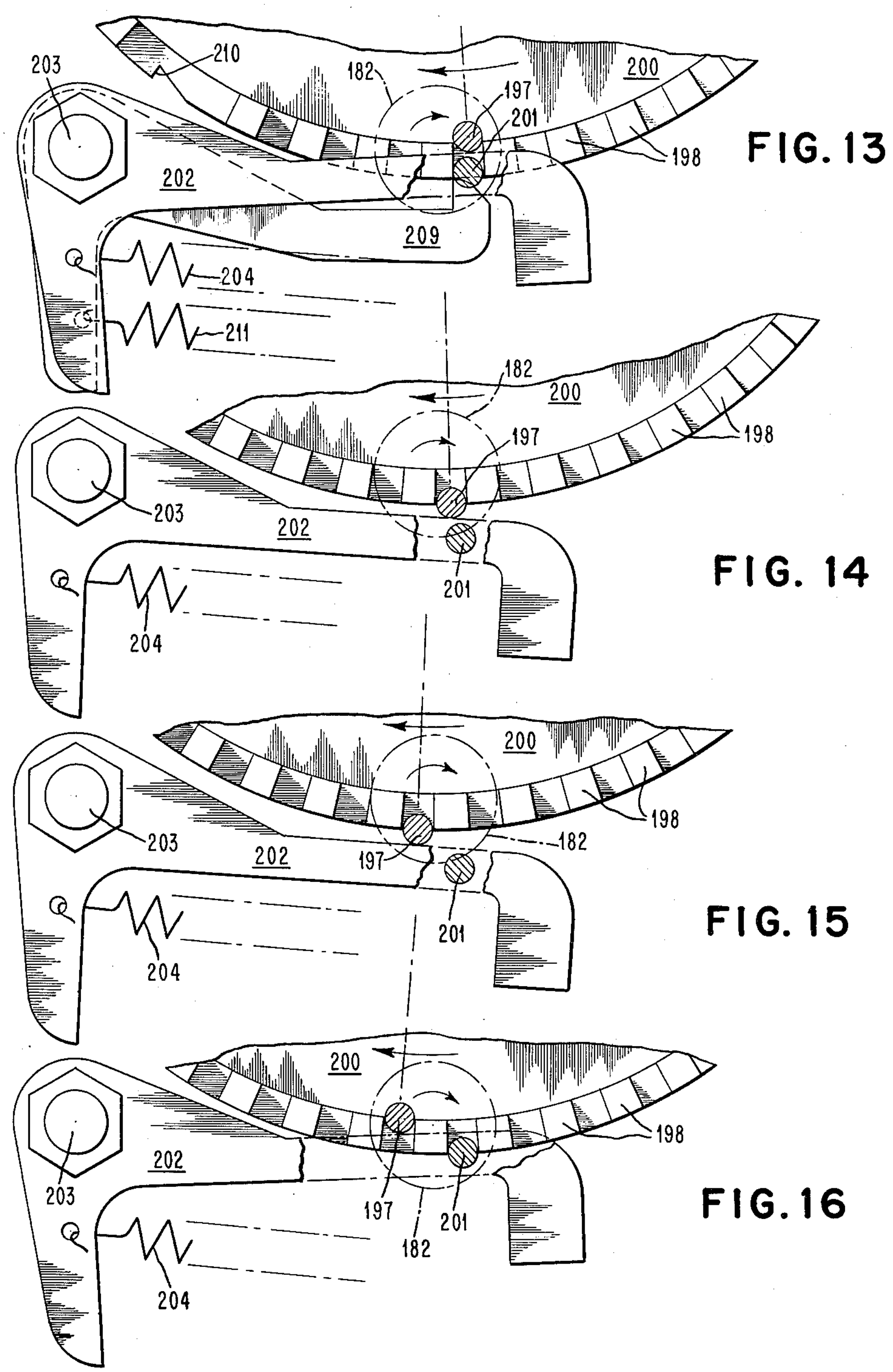

FIGS. 13, 14, 15 and 16 show the relationship between pins 197 and 201 while driving the disc 200. In FIG. 13 the pin 197 is entering the space between teeth and has started to cam pawl 202 in a clockwise direction. In FIG. 14 the pin 201 is fully disengaged from teeth 198 and pin 197 has started to rotate disc 200 in a clockwise direction. FIG. 15 shows the pin 197 starting upward having gone through a dwell and remained between the same two teeth during the above action. FIG. 16 shows the pin 201 entering the next tooth space and the drive pin 197 leaving the teeth to take up a position as shown in FIG. 11, where the disc is locked by the pin 201. From this it can be seen that the disc rotates with an intermittent motion to move a print carriage one letter space at a time.

The disc 200 is secured to a shaft 208 on which is fastened a double pulley 210 around which is wrapped a bight of a metal ribbon or cord for moving the print carriage 15. The carriage, after completing a printing operation, may be returned to one of two positions by coil spring 219 which has been wound by the Geneva drive. In the instant disclosure there are two possible fields in which data can be printed on the document.

It will be obvious that by a rearrangement of parts any number of fields of printing may be effected on any part of the document. Ordinarily printing will be done in only one field, but at times it may be desirable to print in a second field. Selection of one of these fields is made by a magnet 212, the armature 213 of which has a link 214 secured to its outer end. Link 214 in turn is secured to a pawl 215 pivotally mounted in a bracket 216 secured to housing 181. The pawl 215 cooperates with a stop plate 217 secured to the disc 200. This plate has two stop notches thereon one deeper than the other. With the magnet 212 normal the pawl 215 will engage notch 218 and the carriage will be returned to a position to print in one field. If, however, the magnet 212 is actuated the pawl 215 will be lowered to engage notch 220 and thus permit printing in the second field.

A dash pot 221 is provided to cushion the return of the print carriage by decelerating the rotation of shaft 208 toward the end of its return movement. This is effected by a two armed stop 222 secured to shaft 208. One arm 223 is longer than the other and works in conjunction with tooth 218 when stopping the carriage in one field. The other arm 224 limits the return to the other field. Each arm has a turned over lug on the end thereof adapted to act with a pivoted extension 225 of the dash pot plunger 226. The extension has a slot 227 therein adapted to engage a pin 228 carried in the link 214. The arm 225 as shown in FIG. 12 is in the fully operated position. Normally it would be extended to the right until the end of slot 227 engages pin 228. As the arm 223 strikes the arm 225 the medium (oil or air) in the dash pot is compressed and the shaft 208 decelerates until stopped by tooth 218 contacting stop pawl 215. Should magnet 212 be actuated the arm 225 is lowered together with pawl 215 by link 214 into the path of arm 224 and stop 220 to decelerate and stop the return of the carriage to print in the second field.

Secured to the shaft 208 is a cam 230 which cooperates with a roller on an arm 231 pivoted on stub shaft 203. The nose of this arm controls the contacts 232 which in turn control the circuit for the print control relay which actuates the print clutch to effect printing. Also secured to the dash pot plunger 226 is a finger 233 for controlling contacts 234 that act in series with the above contacts 232 to indicate that the print carriage is in home position.

Secured to the extreme rear end of shaft 208 (FIG. 11) is a brush carrier 235 for an emitter 236 secured to the frame 181.

The machine is now ready to print and the closure of the circuit to the print clutch magnet actuates the print clutch 183. The drive to this clutch is over belt 184 (FIG. 2) by pulley 185 to pulley 189 on shaft 188 which through the clutch drives shaft 250 (FIG. 4) to which is secured a pulley 251 which through belt 252 drives a print cam shaft as will be described later.

The printing mechanism 15 is carried in a frame composed of two brackets 253, formed as shown in FIGS. 4 and 18, secured to the plate 20 and connected together by tie rods 254, 255 and 256. Mounted on these rods is a carriage 260 formed as shown in FIGS. 17, 19 and 20 having a double bearing portion 257 (FIG. 19) slidably mounted on rod 256 and a pair of rollers 258 (FIG. 17) carried in the upper end that cooperate with the rod 254 to permit free lateral movement. Journalled in a bracket secured to the right hand frame member 253 is a pulley 261 (FIG. 4) about which is carried a drive belt 262 preferably a metal ribbon or band. This band has both ends secured to the carriage 260 and is carried in a bight about the pulley 210 of the indexing mechanism. Rotation of pulley 210 in one direction positively drives the carriage in letter space increments and in the other direction returns the carriage to one of two initial printing positions. Journalled in frame 253 is a cam shaft 263 for controlling the sequence of operation of the printing mechanism.

The printing is done by three print wheels 264, 265 and 266 (FIG. 22). Wheels 264 and 265 carry type representing the code bits corresponding to the character type on the wheel 266 and all are secured in coded alignment to a shaft 267 journalled in frame 260. Secured to the other end of shaft 267 is a double pulley 268 about which is wrapped a tape running to the set up mechanism 193, the operation of which will be described later.

The cam shaft 263 has two parallel recesses 273 (FIGS. 17 and 22) ground therein which form shoulders adapted to be engaged by rollers 271 carried in a sleeve 272. The shoulder and rollers permit the sleeve to move laterally on the shaft and still be positively connected for rotation therewith. The sleeve 272 is of sufficient length to permit the cams, for rotary alignment of the type and the firing and restoring of the print hammers, to be mounted thereon and secured thereto.

Printing is effected by hammers pressing the paper and an ink ribbon against the type. The ribbon 240, which is impregnated with ink having magnetic particles therein, is carried on a reel 238 in a well known manner.

A print hammer 270 (FIGS. 21 and 22) is provided for the character type and a second print hammer carried in an arm 274 is provided for the code type. Both hammer and arm are mounted on a shaft 275 secured in the carriage 260 and are provided with a lug 276 thereon which is engaged by spring actuated arms 277 also pivoted on the shaft 275. The lug 276 also acts as a cam follower to engage one of two cams 280 which are identical and a cam 281 all of which are pinned together and secured to sleeve 272.

Hammer 270 is a simple lever, the end of which presses an ink ribbon 240, paper 241 and a platen 278 against the wheel 266 to effect printing. The platen 278 is a strip of plastic or other semiresilient material stretched between brackets (not shown) on members 253. The hammer operating lever 274 is bail shaped as shown in FIG. 21 with a foot 282 adapted to engage an adjustable anvil 283 (FIG. 19) pivoted at 284 to the frame of the carriage and is adjusted by screw 285. Pivotally mounted in the bail 274 at 286 is a hammer 290 adapted to coact with the code type wheels 264 and 265. The lower end of hammer 290 is pivoted to an arm 288 which is pivotally mounted on the carriage 260 at 287 thus forming a parallel linkage 274—288 whereby when arm 274 is rocked, the hammer 290 will strike type wheels 264 and 265 evenly. The hammers are driven by springs 291 secured to the spring arms 277 which engage the lugs 276. The extreme rear ends of the hammer 270 and hammer bail 274 are adapted to be engaged by a print suppression latch member 292 which is pivoted at 293 in a bracket 294 (FIG. 20) secured to the frame by the nut fastening shaft 275. The latch is bell crank in shape and the horizontal arm is forked to engage a bar 295 (FIG. 3) of a bail carried by two cam operated arms 296 pivoted in the frame member 253. Bail arms 296 (FIG. 18) cooperate with cams 297 secured to shaft 263 and are rotated in synchronism with the hammer firing and type aligning cams. The tail of each arm 296 is formed with an upstanding ear which is adapted to cooperate with a lip 197 formed on the armature of each of two magnets 298. Spring 299 holds the bail arms or cam followers 296 in engagement with the cams 297. With the magnets 298 in normal or unoperated position the ear of arm 296 clears the lip 279 as shown. Under these conditions the arms 296 are free to follow their associated cams thus rocking the print suppression latch 292 into the path of the print hammer 270 and hammer arm 274 to prevent printing. Operation of magnets 298 as shown in FIG. 17 will engage the ear on latch 292 with the lip 279 on the armature of the relays. This will permit the hammer 270 and hammer arm 274 to follow the contour of cams 280 until the drop off point at which time hammer 270 carries the paper 240, ribbon 241 and platen 278 against the character type wheel 266 and hammer arm 274 carries hammer 290 against the paper printing from wheels 264 and 265. The foot 282 presses the paper against the anvil 283 which acts as a gauge thus limiting the stroke of the hammer 290 to insure equal distribution of ink in printing of the coded date. After printing is completed the cam 281 will pick up the hammer 270 and arm 274 and restore them to a position where the latch 292 can again engage their tails and thus prepare for another print operation.

It will be noted in FIG. 30 that the timing of cams 280, 281 and 297 is such that cam 297 becomes effective about 25° after the hammers are all the way up and can no longer engage the hammers about 90° before they would be fired. This provides plenty of time for latching and unlatching and allows clearance for easy engagement.

Prior to printing, the type wheels were positioned by a set up device 193 which will be described hereafter. In order to insure correct positioning of the type, a rotary aligner is provided. A cam 300 (FIGS. 4 and 22) fastened to the shaft 263 actuates a follower 301 pivoted on shaft 275. The follower is connected by a link 302 to a pawl 303 which cooperates with the teeth of a star wheel 304 secured to the type wheel shaft 267. The pawl 303 is biased into the teeth of the star wheel 304 by a spring 305. During the high dwell of cam 300 the pawl 303 is free of the star wheel permitting the type wheels to be freely set. In order to adjust the relation between the star wheel and pawl, to insure accurate alignment, the pivot of the pawl is carried in an eight shaped member 306 (FIG. 19) pivoted on shaft 267 and slotted at its upper end to receive an adjusting screw 307. To further insure correct alignment the head of member 306 is engaged on each side by adjusting screws 308.

As mentioned above the type wheels are positioned by a setup mechanism 193 (FIG. 4) which controls the incremental movement of a tape 310. The tape passes over two idler pulleys 311 and 312, both of which are pivoted on the plate 20 which by the way, has been removed in FIG. 4. The tape is then fastened to a bell crank 313 after passing over a curved flat surface formed thereon. Bell crank 313 is also pivoted on the plate 20 and is biased in a clockwise direction by a spring 314. The bell crank 313 carries a pulley 315 and a second pulley 316 is mounted in the right hand frame member 253. A tape 317 (FIG. 20) is carried from the type carriage frame 260 where it is secured, over pulley 315 around pulley 268 in a bight as indicated at 318 and thence over a flattened hook shaped portion of an arm 320 to which it is fastened by a screw 321. The arm 320 is pivoted to the carriage 260 and is biased in a clockwise direction by a spring 322.

Any movement of tape 310 in either direction will rock bell crank 313 thus lengthening or shortening the loop formed by tape 317 which will rotate pulley 268 and thus position the type wheels. This action can take place with the carriage in any letter space position as the tape 317 merely feeds around the pulleys 315 and 316 as the carriage is moved laterally, without in any way affecting the type wheels, but a slight change in the dimensions of the loop 317 will alter the print wheels in their position.

The set up mechanism 193 is contained in a frame comprising two plates 330 and 331 (FIGS. 23 and 24) secured together by bars 332, 333, 334, 335 and 336. Plate 331 is secured to the main frame plate 20 which is provided with an aperture for the drive shaft 192. This shaft is journalled in plates 330 and 331 and has a double groove pulley 190 secured on the end thereof. As described above, the shaft 192 is actuated by belt 186 which is driven by pulley 188 under control of the print clutch 183.

Secured on shaft 192 are four cams 341, 342, 343 and 345 which cooperate with rollers 340 on slides 344, 346, 347 and 348. The slides are guided for reciprocal movement by combs 351, 352, and 353 fastened to bars 333, 334 and 335 respectively. Springs 354 bias slides 344, 346 and 348 upward and spring 355 holds slide 347 down each against its associated magnet operated latch member.

Located alongside slide 348 is a slide 350 which is held in position by a finger 356 secured to bar 333 and engaging the upper end of the slide. A spring 363 holds the slide in engagement with the finger 356. Mounted on slides 344, 346, 347 and 350 are pulleys 364, 365, 366 and 367 respectively. A fifth pulley 368 is mounted on a boss on bar 333. The band 310 mentioned above has its end secured under nut 370 and passes (as shown) around pulleys 364, 368, 365, 366 and 367 and over pulley 311 and thence to the bell crank 313 as described above.

Associated with each slide is a magnet, the armature of which forms a latch that prevents the actuation of said slide until the magnet is operated. The magnets 371 and 372 associated with slides 344 and 346 block their movement by interposing the foot of their armatures 374 and 376 against a heel on the slide. The armature 377 of magnet 373 is formed as a hook and holds its associated slide 347 from movement. The slide 350 has a latch member 360 pivoted on the heel thereof which latch has a forked end straddling a pin 361 secured in the end of the armature 362 of magnet 375. Each interposer and latch holds its associated slide from cooperation with their cams except slide 348 which operates every cycle. Operation of any magnet will actuate the associated latch to permit the slide to follow its cam and thus alter the position of the pulley thereon by slackening or taking up the band 310 (FIG. 4) and permitting the spring 314 or the band to rock bell crank 313 and thus shorten or lengthen the loop formed by band 317 to rotate the print wheels to the character selected by the operation of one or more magnets 371, 372 and 373. Operation of magnet 375 (removed for clarity in FIG. 23) will rock armature 362 and pin 361 thus rocking latch 360 into engagement with the heel of slide 348 which will pick up the slide 350 in turn taking up band 30 and elongating the loop of band 317 and thus position the type wheels 264, 265 and 266.

As shown in FIGS. 25, 26 and 27 described above, the operation of the set up mechanism depends on the four cams 341, 342, 343 and 345. As indicated in FIG. 27 cam 341 moves its associated slide 344 one increment; cam 342 its slide 346 two increments and cam 343, its slide 347 three increments. These increments of movement are considered to be in a negative direction in that they permit the cable 310 to be payed out thus lengthening band 317 and rotating the print wheels clockwise as seen in FIG. 20. Conversely, cam 345 moves its slide 350 five increments in a positive direction. It will be seen from FIG. 27 that one negative increment will position the print wheel to print an asterisk whereas three positive increments, which are composed of two negative and five positive increments combined, will position the print wheels to print a two. The action of the slides 346 and 350 to obtain this movement is shown graphically in FIG. 25. Here it will be seen that slide 346 has been moved up two increments carrying its pulley 365 up and thus paying out the cable 310, also slide 350 has been moved five increments in an opposite or positive direction thus regaining three increments of cable 310. In FIG. 26 the slides 344 and 347 have moved their associated pulleys 364 and 366 one and three steps negatively thus paying out four increments of cable 310 to present a seven at the print position.

The data to be printed is entered from two sources, namely, the keyboard 12 and the adding machine 11. The keyboard 12 is used for permanent data that is to be printed repeatedly and is stored by locking down the keys which in turn close contacts. This data is of no importance to the invention so no further description will be given.

The adding machine 11 is of the Ten Key Type and operated essentially the same as the multiplying portion of a calculating machine disclosed and described in the patent to C. M. Friden et al. 2,376,997. The data is entered in a set bar basket 378 (FIG. 29) which is stepped a column at a time to the left as the digits are entered and stored. Depression of a key 379 through bell crank 381 raises a set bar 380 in the set bar basket 378. When all of the digits are entered actuation of the motor bar 394 releases a segment 382, one for each order of the set bar basket. This segment through finger 383 is stopped by the raised set bar in each order. The cycle initiated by the motor bar is such that for about 170° the segment 382 rotates clockwise sensing the set bar basket. From that point to about 180° the segment 382 rotates counterclockwise. During the 10° interval, a frame 384 carrying three meshed gears is rocked to mesh with the segment 382. The uppermost gear in the frame 384 is in mesh with the actuator 385 so that any counterclockwise rotation of segment 382 will result in a counterclockwise rotation of the actuator 385. Secured to the actuator by a link 386 is slide 387 carrying brushes that wipe over the printed circuits 389, that forms a storage means 395. At the completion of the cycle the frame 384 is rocked counter clockwise disengaging the gear 384A from sector 382 and the data entered in the keyboard has thus been transferred to the storage medium in the printed circuits 389 since the brushes now rest on the segments indicative of the data entered.

Any other well known segmental contacts such as a commutator, switch points, etc., could well be used in place of the printed circuits referred to above.

Referring now to the circuit of FIGS. 28, 28A and 28B and timing diagram of FIG. 20, the operation of the device will be explained. The operator actuates switch 390 to connect the main supply to the motor 26 and the power pack 391 making the relay circuits effective. At this point it is to be noted that there are two sets of cam controlled circuit breakers in the inscriber which are designated CB and FCB. The CB breakers are contained in unit 196 and are driven under control of the print clutch by belt 194 and are therefore effective during a print cycle. The FCB breakers are under control of the feed clutch 100 and are driven during a feed cycle. A circuit breaker ACB is also provided in the adding machine and is effective during each adding machine cycle.

As soon as current is applied Feed Roll relay 431 (FIG. 28A) is operated providing the Feed Roll Interlock contact 57 is closed. Operation of the Start key 392 closes the circuit for the Start relay 401 (FIG. 28). Relay 401 locks up through its contact 401–1 and remains locked up until current is removed by opening switch 390. These two relays prepare a circuit for Feed Control relay 416 which may be completed either by operation of the Eject key 393 or the Entry relay 419 and Feed relay 415. The Eject key is operated whenever it is desired to clear the machine by removing a document that has not been ejected normally. The Entry and Feed relays control normal feeding.

The circuit is now ready for the operator to enter data read from the document into the keyboard of the machine. This stores the data in the set bar basket 378 until the motor bar 394 is actuated. Actuation of the motor bar causes the data to be transferred to the printed circuit storage 295 (FIG. 28B) and rotates ACB–1. A contact 396 (FIG. 28A) is closed by the set bar basket upon its first step away from normal. This prepares a pick circuit for the Feed relay 415. This circuit is completed by ACB–1 at 125° of the adding machine cycle and actuates Feed relay 415 which locks through its 415–1 contact under control of the contact 408–7 of the Print Control relay 408.

The document can now be inserted in the slot 14 of the feed mechanism. Here it is grasped by feed rolls 24 and transported to the rear of the machine closing contacts 97 by raising buttons 96. This completes the pick circuit for Entry relay 419 which locks up momentarily over its hold circuit to drain off current from the pick winding should a document become stuck in the contacts 97. Relay 419 through its contact 419–2 (FIG. 28) completes the pick circuit for the Feed Control relay 416. The hold circuit is completed through 416–1 and FCB–1 which is held closed through 310° of the feed cycle. Relay 416 through its contacts 416–2 operates the Feed Clutch 100 which starts the feed cycle by rotating cam 106 which raises the rollers 81, to start the document through the machine. Subsequently, the stop member 110 is raised into the path of the document by the cam 108 and the document is then grasped by the grippers 116 under control of cam 117. The probe 125 is then rocked into contact with the document closing contact 126 which prepares pick circuits for Eject Control relay 442 and Document relay 421. At 10° of the feed cycle Print Carriage Restore relay 162 (FIG. 28A) is actuated through its pick circuit by FCB–2 and it locks up through its holding winding through contacts 162–A. Contact 162–A closes the operating circuit for the Index Restore solenoid 207 which withdraws the holding pawl 209 permitting spring 219 to restore the indexing disc 200 which in turn returns the print carriage 15 to one or the other of the print positions preparatory to printing the data entered in the storage 395.

At 318° of the feed cycle relays 442 and 421 are operated by closure of FCB–3. Relay 421 locks up over a hold circuit through contact 421–1 and CB–1.

Upon return of the print carriage to the selected home position, contacts 232 and 234 are closed completing a circuit through the pick winding of Home relay 433 (FIG. 28A) which locks up through its hold winding. Operation of relay 433 will close the pick circuit of the Print Control relay 408 through CB–1 contacts 421–2 and 433–2 now closed and the winding of the relay which holds up over CB–5 (FIG. 28) break contact 406–4 and make contact 408–1 and the hold winding of the relay. Relay 408 operates the Print Clutch magnet 183 through CB–6 and contacts 408–2, starting the rotation of the CB circuit breakers and the Emitter 236 which reads out the data in storage 395.

As the brush 235 (FIG. 28B) starts to move it connects the common bus 409 to a bus 411 which is connected over lead 412 through the Non-Print magnets 298 operating them to permit operation of the hammers 270 and 290 as described above.

As the emitter makes each contact live, a circuit is completed by the associated brush 235 through the printed circuits 389 to the set up slide control magnets 371, 372, 373 and 375. If, for instance, a two is stored in column six a circuit will be closed through the emitter 236 to the column six common through brush 388, number two common over lead 403 through a diode over lead 404, through the winding of magnet 375 releasing the slide 350 for five increments of movement. A second circuit is completed over leads 403 and 405, through a diode lead 407 and through the winding of magnet 372 releasing slide 346 for two increments of movement. The sum of these two movements results in setting type wheel 64 in position to print a two.

Should the probe 125 fail to find a document at the print station, the No Document relay 422 (FIG. 28) will be picked over a circuit through FCB–3 break contact 126, contact 418–2 through the pick winding of the relay. It will hold up through contacts 418–3 and 422–1 and hold winding of the relay. Contact 422–1 closes a circuit for Feed Failure lamp 402 which lights indicating a No Document condition. Operation of the Eject key 393 at this point, will pick the Eject relay 418 over contacts 401–2, 431–1, 408–3 key 393 contact 419–3 and pick winding of the relay, which holds up over two circuits either through FCB–4 contact 418–1 and hold winding of the relay or contacts 416–3 and 418–1 through the hold winding. This will clear any documents in the machine unless there is a jam condition which must be cleared by the operator. Operation of Eject relay 418 will open the Feed Failure lamp circuit at 418–3 thus extinguishing the lamp.

As described above, a document, which will be designated A, in the printing position closes the Probe contact 126 which during 318–348° of the feed cycle completes a circuit through FCB–3 contacts 126 and 418–5 for picking the Eject Control relay 442. The holding winding for this relay is not effective as Exit Memory relay 443 (FIG. 28B) is not picked. When the Emitter 236 has completed the pulsing of the Set Up magnets 371, 372, 373 and 375 to effect printing, End of Printing contact 410 in the Emitter completes a circuit for relay 406 under control of CB–2 between 120 and 250° of the print cycle. This relay completes a pick circuit for Eject Memory relay 443 through its contacts 406–2 and 442–2 and relay 443 locks up mechanically under control of its lock release winding. Document A is now released by the grippers 116 and is carried on the belt feed described above to the Exit contacts 161.

Before it reaches the Exit contact however, a document B is fed to the print position and sensed by Probe 125 to close contact 126 which again picks relay 442. This relay now holds up through contacts 443–3 and 442–1 since the contacts of relay 443 have not been opened. Document A now reaches the Exit contact 161 which momentarily operates Exit relay 441 completing a circuit to operate the locking winding of relay 443 through contacts 401–4, 441–3 and 443–1 thus releasing its associated contacts, thus indicating that document A has left the machine.

Should the document become caught somewhere between the print position and the Exit contact 161, relay 441 would not be actuated and, therefore, relays 442 and 443 would not be released. Under these conditions document B will set up relay 421 in the normal fashion and allow the print cycle to start. At the end of the print cycle relay 406 will be actuated closing a pick circuit for No Document relay 442 through contact 406–2 and transfer contact 442–2. The operation of this relay closes a circuit through contacts 418–3 and 422–1 to light the Feed Failure lamp 402 indicating a feed failure.

If the document A had become trapped under the finger 158 associated with Exit contact 161 the contact will remain closed and, therefore, relay 441 will remain actuated thus closing a circuit through contacts 406–2 and 441–2 to actuate the pick coil of relay 442 and light Feed Failure lamp 402 as described above.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a document handling machine, a first feeding means for feeding a document into said machine, a pair of individual contacts closed by said document, a second feeding means adapted to feed said document at right angles to said first feed and means controlled by both said contacts to disable said first feed and enable said second feed.

2. In a document handling machine, a first feeding means comprising a pair of feed rolls for feeding a document into said machine, a pair of individual contacts closed by said document, a second feeding means comprising a pair of contiguous belts adapted to feed said document at right angles to said first feeding means and means controlled by both said contacts to disable said feed rolls and enable said belts.

3. In a document handling machine, a feed system adapted to transport a document to and from a work position, comprising in combination, a pair of feed rollers adapted to receive a document and transport said document into said machine, a pair of contacts associated with said rollers adapted to be closed by said document, a pair of contiguous belts for transporting said document in a direction differing from that of the feed rolls and to said work position, a plurality of pressure means for moving one of said belts into a driving relation with the other of said belts to grip and feed a document, control means actuated by closure of said contacts to move said pressure means into effective relation with said belt and open said feed rollers to permit said belts to carry said document from said feed rolls to said work position, a stop at said work position for holding said document while being worked upon, a second pair of belts in constant driving relation adapted to carry said document from said work position to a stacker pocket, and a curved plate in the path of said document adjacent said stacker pocket adapted to receive said document and flex it lengthwise whereby said document is stiffened prior to being ejected into said pocket.

4. In a document handling machine, a feed system adapted to transport a document to and from a work position, comprising in combination a feeding means adapted to receive a document and transport said document into said machine, a pair of contacts associated with said feeding means adapted to be closed by said document, a second feeding means for transporting said document in a direction different from that of said first feeding means and to said work position, a plurality of pressure means for causing said second feeding means to grip and feed a document, control means actuated by closure of said contacts to move said pressure means into effective position and disable said first feeding means to permit said second feeding means to carry said document to said work position, a stop at said work position for holding said document while being worked upon, a third feeding means adapted to carry said document from said work position to a stacker pocket, and a flexing means in the path of said document adjacent said stacker pocket adapted to receive said document and curl it lengthwise whereby said document is stiffened prior to being ejected into said pocket.

5. In a document handling machine, a feed system adapted to transport a document to and from a work position, comprising in combination a pair of feed rollers adapted to receive a document and transport said document into said machine, a pair of contacts associated with said rollers adapted to be closed by said document, a pair of contiguous belts for transporting said document in a direction differing from that of the feed rollers and to said work position, a plurality of bell cranks carrying rollers for moving one of said belts into driving relation with the other of said belts to grip and feed a document, cam actuated means for rocking said bell cranks to move said rollers into effective relation with said belt and disable said feed rollers to permit said belts to carry said document from said feed rollers to said work position, a magnetic clutch controlling the operation of said cam actuated means, said clutch being operated by closure of said contacts, a gripper at said work position for holding said document while being worked upon, a second pair of belts in constant driving relation adapted to carry said document from said work position to a stacker pocket, and a curved plate in the path of said document adjacent said stacker pocket adapted to receive said document and flex it lengthwise whereby said document is stiffened prior to being ejected into said pocket.

References Cited in the file of this patent

UNITED STATES PATENTS

| | | |
|---|---|---|
| 1,011,046 | Freeman | Dec. 5, 1911 |
| 1,758,134 | Weingartner | May 13, 1930 |
| 1,885,525 | Lippert | Nov. 1, 1932 |
| 1,891,286 | Miersch | Dec. 20, 1932 |
| 2,046,001 | Scharr | June 30, 1936 |
| 2,328,636 | Fitch et al. | Sept. 7, 1943 |
| 2,632,643 | Egan et al. | Mar. 24, 1953 |
| 2,757,775 | Hickerson | Aug. 7, 1956 |
| 2,760,654 | Gobel et al. | Aug. 28, 1956 |
| 2,796,259 | Fawcett | June 18, 1957 |
| 2,813,715 | Oldenboom | Nov. 19, 1957 |